(12) United States Patent
Lee et al.

(10) Patent No.: US 12,379,691 B2
(45) Date of Patent: Aug. 5, 2025

(54) SPATIAL PROPERTY OR COLOR IMPLEMENTATION PROPERTY MEASUREMENT DEVICE OF HOLOGRAPHIC IMAGES

(71) Applicant: Korea Photonics Technology Institute, Gwangju (KR)

(72) Inventors: Kwang Hoon Lee, Anyang-si (KR); Kyung Il Joo, Naju-si (KR); Seon Kyu Yoon, Gwangju (KR); Jin Su Lee, Gwangju (KR); Min Kyu Park, Gwangju (KR); Hoe Min Kim, Gwangju (KR)

(73) Assignee: Korea Photonics Technology Institute, Gwangju (KR)

( * ) Notice: Subject to any disclaimer, the term of this patent is extended or adjusted under 35 U.S.C. 154(b) by 218 days.

(21) Appl. No.: 18/082,561

(22) Filed: Dec. 15, 2022

(65) Prior Publication Data
US 2023/0204454 A1   Jun. 29, 2023

(30) Foreign Application Priority Data

Dec. 29, 2021  (KR) ........................ 10-2021-0190709
Dec. 29, 2021  (KR) ........................ 10-2021-0190713

(51) Int. Cl.
G03H 1/22 (2006.01)
G01B 9/02 (2022.01)
G02B 5/18 (2006.01)
G03H 1/26 (2006.01)

(52) U.S. Cl.
CPC ....... *G03H 1/2294* (2013.01); *G01B 9/02047* (2013.01); *G03H 1/2202* (2013.01); *G03H 1/265* (2013.01); *G02B 5/18* (2013.01); *G03H 2001/2247* (2013.01); *G03H 2001/2263* (2013.01); *G03H 2226/11* (2013.01); *G03H 2227/03* (2013.01)

(58) Field of Classification Search
CPC .. G01B 9/02047; G01B 9/021; G03H 1/2202; G03H 1/2294; G03H 2001/2247; G03H 2001/2263; G03H 2227/03
See application file for complete search history.

(56) References Cited

U.S. PATENT DOCUMENTS

| | | | |
|---|---|---|---|
| 4,802,758 A * | 2/1989 | Fabbiani | G03H 1/22 359/2 |
| 2008/0192312 A1* | 8/2008 | Hendricks | G03H 1/0808 359/13 |
| 2017/0024890 A1 | 1/2017 | Yoon | |
| 2018/0292787 A1 | 10/2018 | Lim et al. | |
| 2018/0341222 A1 | 11/2018 | Nam et al. | |
| 2020/0158597 A1* | 5/2020 | Stevenson | G01M 11/0271 |

FOREIGN PATENT DOCUMENTS

KR   10-2298048   9/2021

OTHER PUBLICATIONS

English Specification of 10-2298048.

* cited by examiner

*Primary Examiner* — Michael A Lyons
(74) *Attorney, Agent, or Firm* — Dinsmore & Shohl LLP; Yongsok Choi, Esq.

(57) ABSTRACT

Disclosed is a spatial property measurement device or color implementation property of a holographic image. According to an aspect of the present embodiment, a spatial property measurement device or color implementation property of a holographic image reproduced by a holographic display device is provided.

4 Claims, 25 Drawing Sheets

SPATIAL PROPERTY OR COLOR IMPLEMENTATION PROPERTY MEASUREMENT DEVICE OF HOLOGRAPHIC IMAGES

CROSS-REFERENCE TO RELATED APPLICATION(S)

This application claims priority to Korean Patent Application Nos. 10-2021-0190709, filed on Dec. 29, 2021, and 10-2021-0190713, filed on Dec. 29, 2021, in the Korean Intellectual Property Office, the disclosures of which are incorporated by reference herein in their entireties.

STATEMENT REGARDING KOREAN GOVERNMENT SUPPORT

This work was supported by Institute of Institute of Information & communications Technology Planning & Evaluation (IITP) grant funded by the Korea government (MSIT) (No. 2021-0-00343, Development of metrology for the properties of reconstructed digital hologram's space and color).

TECHNICAL FIELD

The present disclosure relates to a spatial property or color implementation property measurement device of a holographic image reproduced by a holographic display device.

DISCUSSION OF RELATED ART

The contents described in this part merely provide background information on the present embodiment and do not constitute prior art.

A holographic display method is being considered, such as a three-dimensional image display method in which the sense of depth perceived by the brain and the eyes' focus match and provide full parallax. The holographic display method operates on the following principle. An interference pattern is obtained by interfering with the object light reflected from the original object with the reference light. When the reference light is irradiated and diffracted on the hologram pattern recorded with the obtained interference pattern, the image of the original object is reproduced.

The currently considered holographic display method provides a computer-generated hologram (CGH) signal as an electrical signal to a spatial light modulator (SLM) rather than directly exposing an original object to obtain a hologram pattern. According to the input CGH signal, the spatial light modulator forms a holographic pattern and diffracts the reference light to generate a 3D image.

A conventional holographic display device may have different spatial property of the holographic image it outputs according to the specifications of the components used. For example, spatial property may include whether a holographic image with a volume (having a diffraction angle) can be output and how much the holographic image to output matches the original. Conventionally, the spatial property of a holographic display device depend only on information disclosed by the manufacturer of the corresponding device. However, there was no method to measure and verify whether the holographic image output by the device actually matched the published information.

Accordingly, there is a demand for a method for measuring the spatial property of holographic images output by each holographic display device.

Further, the holographic display device may have different color implementation property of the holographic image it outputs according to the specifications of the components used. Conventionally, the international commission on illumination (CIE) coordinate system shown in FIG. 20 has been used to detect color implementation property of images or videos.

FIG. 25 is a diagram illustrating a CIE coordinate system.

As shown in FIG. 25, in terms of color at a specific pixel or point, values of R (redness), G (greenness), and B (blueness) are measured to determine how the color appears at that pixel or point.

However, the conventional CIE coordinate system was defined for colors perceived by humans in 1931 and corresponded to a coordinate system defined based on a standard light source (white light). Accordingly, it is inaccurate to determine a color in a holographic image output from a holographic display device using monochromatic light, in particular, laser light having an ultra-narrow band to generate a holographic image. That is, there was a problem that although the color (wavelength) at a specific voxel or point in the holographic image accurately represents blue (480 nm), it is not perceived as blue from the (human) user's point of view, and thus the numerical value of the CIE coordinate system is significantly underestimated.

Considering these points, there is a demand for a device that measures color reproduction property in devices using monochromatic light (ultra-narrowband light) rather than standard light sources.

SUMMARY

An object of one embodiment of the present disclosure is to provide a spatial property measurement device of a holographic image reproduced by a holographic display device.

Another object of one embodiment of the present disclosure is to provide a color implementation property measurement device of a holographic image reproduced by a holographic display device.

According to one aspect of the present disclosure, the spatial property measurement device of a holographic image output from a holographic display device comprises a light receiver receiving and sensing light output from a light source within the holographic display device and diffracted from a spatial light modulator within the holographic display device, a diffraction element disposed in front of the light receiver in a direction in which the light diffracted from the spatial light modulator is incident and re-diffracting the light diffracted from the spatial light modulator, a rotation element fixed within a predetermined range from the spatial light modulator at one end and fixed to the light receiver at the other end to rotate the light receiver and adjusting a distance between the light receiver and the spatial light modulator, and a controller adjusting the rotation angle of the rotation element and the distance between the light receiver and the spatial light modulator and analyzing the sensed value by the light receiver, thereby determining whether there is an abnormality in the arrangement of the spatial light modulator in the holographic display device.

According to one aspect of the present disclosure, the diffraction element is an analog diffraction grating.

According to one aspect of the present disclosure, the controller determines whether there is an abnormality in the arrangement of the spatial light modulator in the holographic display device based on whether the angle of the point having the strongest light amount among the values sensed by the light receiver changes for each distance while changing the distance between the light receiver and the spatial light modulator.

According to one aspect of the present disclosure, the spatial property measurement device of a holographic image output from a holographic display device comprises a light receiver receiving and sensing light output from a light source within the holographic display device and diffracted from a spatial light modulator within the holographic display device, a diffraction element disposed in front of the light receiver in a direction in which the light diffracted from the spatial light modulator is incident and re-diffracting the light diffracted from the spatial light modulator, a rotation element fixed within a predetermined range from the spatial light modulator at one end and fixed to the light receiver at the other end to rotate the light receiver and adjusting a distance between the light receiver and the spatial light modulator, and a controller adjusting the rotation angle of the rotation element and the distance between the light receiver and the spatial light modulator and analyzing the sensed value by the light receiver, thereby determining whether there is an abnormality in diffraction property of the spatial light modulator in the holographic display device.

According to one aspect of the present disclosure, the diffraction element is an analog diffraction grating.

According to one aspect of the present disclosure, the controller determines whether there is an abnormality in the diffraction property of the spatial light modulator in the holographic display device based on whether the angle of the point having the strongest light amount among the values sensed by the light receiver changes for each distance. The controller determines whether the angle changes nonlinearly while changing the distance between the light receiver and the spatial light modulator.

According to one aspect of the present disclosure, the controller determines that the angle of the point having the strongest light amount among the values sensed by the light receiver changes for each distance while changing the distance between the light receiver and the spatial light modulator. The controller determines that an abnormality has occurred in a diffraction property of a spatial light modulator in the holographic display device when the angle changes nonlinearly.

According to one aspect of the present disclosure, the spatial property measurement device of a holographic image output from a holographic display device, comprises a beam width adjustment unit adjusting a beam width of light output from a light source in the holographic display device, a light receiver receiving and sensing light output from a light source within the holographic display device and diffracted from a spatial light modulator within the holographic display device, a diffraction element disposed in front of the light receiver in a direction in which the light diffracted from the spatial light modulator is incident and re-diffracting the light diffracted from the spatial light modulator, a rotation element fixed within a predetermined range from the spatial light modulator at one end and fixed to the light receiver at the other end to rotate the light receiver and adjusting a distance between the light receiver and the spatial light modulator, and a controller adjusting the beam width of the light output by the beam width adjustment unit, the rotation angle of the rotation element and the distance between the light receiver and the spatial light modulator and analyzing the sensed value by the light receiver, thereby determining whether there is an abnormality in modulation property of the spatial light modulator in the holographic display device.

According to one aspect of the present disclosure, the controller controls the beam width adjustment unit to adjust the beam width of the output light so that the light is radiated to an area equal to or greater than a predetermined ratio from an area of the spatial light modulator.

According to one aspect of the present disclosure, the controller controls the beam width adjustment unit to adjust the beam width of the output light so that the light is radiated to an area equal to or greater than a predetermined ratio from an area of the spatial light modulator.

According to one aspect of the present disclosure, the controller controls the beam width adjustment unit to adjust the beam width of the output light so that the light is radiated to an area less than a predetermined ratio from the area of the spatial light modulator.

According to one aspect of the present disclosure, the controller controls the light to be radiated to one position of the spatial light modulator.

According to one aspect of the present disclosure, the controller compares sensed value of the light receiver when light is radiated to one position of the spatial light modulator in an area less than a predetermined ratio from the area of the spatial light modulator and sensed value of the light receiver when light is radiated to one position of the spatial light modulator in an area equal to or greater than a predetermined ratio from the area of the spatial light modulator, thereby determining whether there is an abnormality in the modulation property in the spatial light modulator in the holographic display device.

According to one aspect of the present disclosure, the spatial property measurement device of a holographic image output from a holographic display device comprises a light receiver receiving and sensing light output from a light source within the holographic display device and diffracted from a spatial light modulator within the holographic display device, a rotation element fixed within a predetermined range from the spatial light modulator at one end and fixed to the light receiver at the other end to rotate the light receiver and adjusting a distance between the light receiver and the spatial light modulator, and a controller adjusting the rotation angle of the rotation element and the distance between the light receiver and the spatial light modulator and analyzing the sensed value by the light receiver, thereby determining whether a light source in the holographic display device is abnormal. The spatial light modulator does not have a modulation property.

According to one aspect of the present disclosure, the color implementation property measurement device of a holographic image output from a holographic display device comprises an optical path adjustment unit adjusting the path of each light of different wavelength bands output from a light source to be the same in the holographic display device, a light receiver receiving and sensing a plurality of lights having different wavelength bands diffracted from the spatial light modulator in the holographic display device through the optical path adjustment unit, a diffraction element disposed in front of the light receiver in a direction in which the light diffracted from the spatial light modulator is incident and re-diffracting the light diffracted from the spatial light modulator, a rotation element fixed within a predetermined range from the spatial light modulator at one end and fixed to the light receiver at the other end to rotate the light receiver and adjusting a distance between the light receiver and the spatial light modulator, and a controller adjusting the rotation angle of the rotation element and the distance between the light receiver and the spatial light modulator and analyzing the sensed value by the light receiver, thereby determining whether a light source in the holographic display device is abnormal. The spatial light modulator does not have a modulation property.

According to one aspect of the present disclosure, the light source radiates light in red, blue and green wavelength bands.

According to one aspect of the present disclosure, the diffraction element is an analog diffraction grating.

According to one aspect of the present disclosure, the rotation element adjusts the distance between the light receiver and the spatial light modulator.

According to one aspect of the present disclosure, the color implementation property measurement device of a holographic image output from a holographic display device comprises an optical path adjustment unit adjusting the path of each light of different wavelength bands output from a light source to be the same in the holographic display device, a light receiver receiving and sensing a plurality of lights having different wavelength bands diffracted from the spatial light modulator in the holographic display device through the optical path adjustment unit, a diffraction element disposed in front of the light receiver in a direction in which the light diffracted from the spatial light modulator is incident and re-diffracting the light diffracted from the spatial light modulator, a rotation element fixed within a predetermined range from the spatial light modulator at one end and fixed to the light receiver at the other end to rotate the light receiver and adjusting a distance between the light receiver and the spatial light modulator, and a controller adjusting the rotation angle of the rotation element and the distance between the light receiver and the spatial light modulator and analyzing the sensed value by the light receiver, thereby measuring the color rendition of the holographic image output from the holographic display device.

According to one aspect of the present disclosure, the controller calculates the size of a voxel forming white color by overlapping each voxel formed by light of different wavelength bands.

According to one aspect of the present disclosure, the rotation element adjusts the distance between the light receiver and the spatial light modulator.

According to one aspect of the present disclosure, the color implementation property measurement device of a holographic image output from a holographic display device comprises an optical path adjustment unit adjusting the path of each light of different wavelength bands output from a light source to be the same in the holographic display device, a light receiver receiving and sensing a plurality of lights having different wavelength bands diffracted from the spatial light modulator in the holographic display device through the optical path adjustment unit, a diffraction element disposed in front of the light receiver in a direction in which the light diffracted from the spatial light modulator is incident and re-diffracting the light diffracted from the spatial light modulator, a rotation element fixed within a predetermined range from the spatial light modulator at one end and fixed to the light receiver at the other end to rotate the light receiver and adjusting a distance between the light receiver and the spatial light modulator, and a controller adjusting the rotation angle of the rotation element and the distance between the light receiver and the spatial light modulator and analyzing the sensed value by the light receiver, thereby measuring the degree of color crosstalk occurrence of the holographic image output from the holographic display device.

According to one aspect of the present disclosure, the controller calculates the size of a voxel forming white color by overlapping each voxel formed by light of different wavelength bands.

According to one aspect of the present disclosure, the controller calculates the size of overlapping portions between adjacent voxels, thereby measuring the degree of color crosstalk occurrence.

According to one aspect of the present disclosure, the degree of color crosstalk occurrence is proportional to the size of overlapping portions between adjacent voxels.

According to one aspect of the present disclosure, the color implementation property measurement device of a holographic image output from a holographic display device comprises an optical path adjustment unit adjusting the path of each light of different wavelength bands output from a light source to be the same in the holographic display device, a light receiver receiving and sensing a plurality of lights having different wavelength bands diffracted from the spatial light modulator in the holographic display device through the optical path adjustment unit, a diffraction element disposed in front of the light receiver in a direction in which the light diffracted from the spatial light modulator is incident and re-diffracting the light diffracted from the spatial light modulator, a rotation element fixed within a predetermined range from the spatial light modulator at one end and fixed to the light receiver at the other end to rotate the light receiver and adjusting a distance between the light receiver and the spatial light modulator, and a controller adjusting the rotation angle of the rotation element and the distance between the light receiver and the spatial light modulator and analyzing the sensed value by the light receiver, thereby measuring the resolution at a preset distance between the light receiver and the spatial light modulator of the holographic image output from the holographic display device.

According to one aspect of the present disclosure, the controller calculates the size of a voxel forming white color by overlapping each voxel formed by light of different wavelength bands, thereby measuring the resolution at a predetermined distance between the light receiver and the spatial light modulator based on the size of the calculated voxel.

According to one aspect of the present disclosure, the color implementation property measurement device of a holographic image output from a holographic display device comprises an optical path adjustment unit adjusting the path of each light of different wavelength bands output from a light source to be the same in the holographic display device, a light receiver receiving and sensing a plurality of lights having different wavelength bands diffracted from the spatial light modulator in the holographic display device through the optical path adjustment unit, a diffraction element disposed in front of the light receiver in a direction in which the light diffracted from the spatial light modulator is incident and re-diffracting the light diffracted from the spatial light modulator, a rotation element fixed within a predetermined range from the spatial light modulator at one end and fixed to the light receiver at the other end to rotate the light receiver and adjusting a distance between the light receiver and the spatial light modulator, and a controller adjusting the rotation angle of the rotation element and the distance between the light receiver and the spatial light modulator and analyzing the sensed value by the light receiver, thereby measuring the color rendition, the degree of color crosstalk occurrence, the resolution at a preset distance between the light receiver and the spatial light modulator, or color implementation property of the holographic image output from the holographic display device.

According to one aspect of the present disclosure, the color implementation property measurement device of a holographic image output from a holographic display device comprises an optical path adjustment unit adjusting the path of each light of different wavelength bands output from a light source to be the same in the holographic display device, a light receiver receiving and sensing a plurality of lights having different wavelength bands diffracted from the spatial light modulator in the holographic display device through the optical path adjustment unit, a diffraction element disposed in front of the light receiver in a direction in which the light diffracted from the spatial light modulator is incident and re-diffracting the light diffracted from the spatial light modulator, a rotation element fixed within a predetermined range from the spatial light modulator at one end and fixed to the light receiver at the other end to rotate the light receiver and adjusting a distance between the light receiver and the spatial light modulator, and a controller adjusting the rotation angle of the rotation element and the distance between the light receiver and the spatial light modulator and analyzing the sensed value by the light receiver, thereby measuring the color implementation property of the holographic image output from the holographic display device.

As described above, according to one aspect of the present disclosure, there is an advantage in that spatial property of a holographic image reproduced by a holographic display device can be objectively measured.

According to one aspect of the present disclosure, there is an advantage in that the color implementation property of the holographic image reproduced by the holographic display device can be objectively measured.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION OF EXEMPLARY EMBODIMENTS

Figure 1:
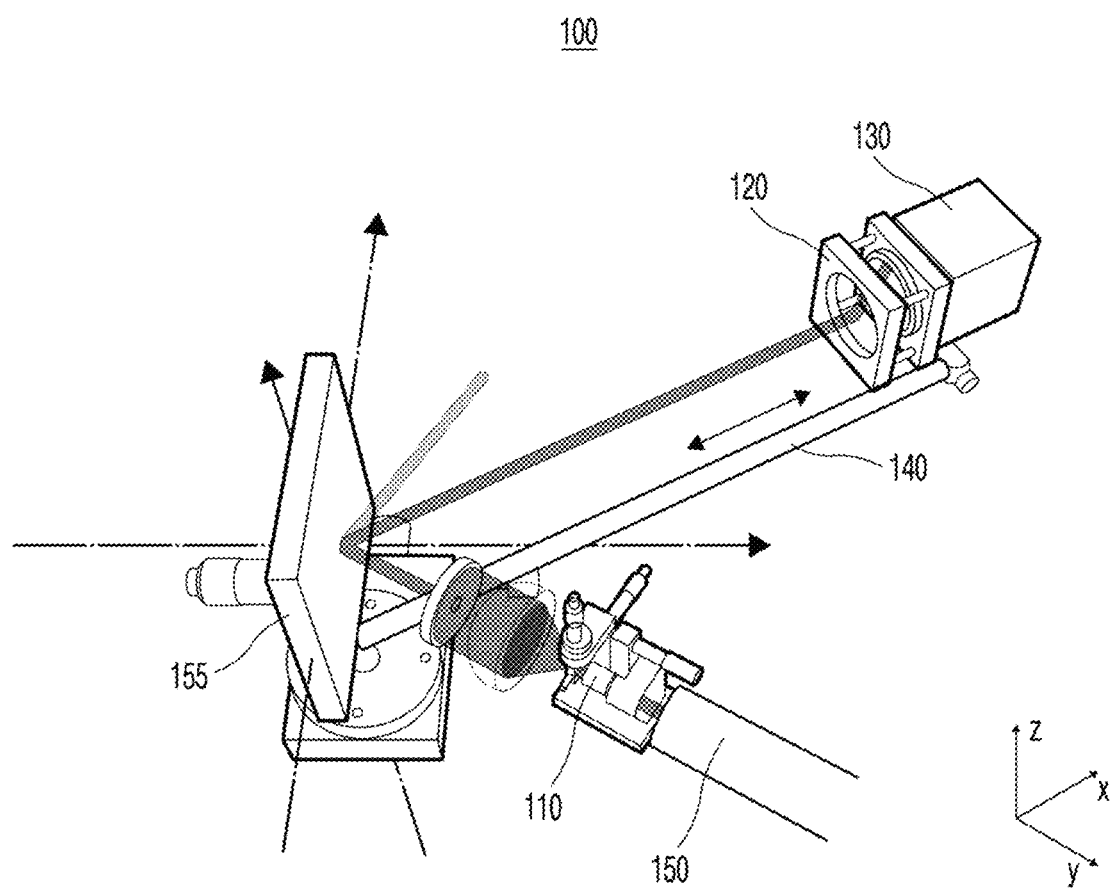
FIGS. 1 and 2 are view showing the configuration of a spatial property measurement device according to an embodiment of the present disclosure.

The present disclosure may make various changes and have various embodiments, so specific embodiments are illustrated in the drawings and described in detail. However, it should be understood that the present disclosure is not intended to be limited to specific embodiments and include all modifications, equivalents, or substitutes included in the spirit and technical scope of the present disclosure. Like reference numerals are used for like elements throughout the description of each figure.

Terms "first," "second," "A," "B," etc. may be used to describe various components, but the components should not be limited by the terms. These terms are only used for the purpose of distinguishing one component from another. For example, a first component may be referred to a second component, and similarly, a second component may be referred to a first component, without departing from the scope of the present disclosure. The term "and/or" includes a combination of a plurality of related items or any one of a plurality of related items.

When a component is referred to as being "coupled" or "connected" to another component, it is understood that the component may be directly coupled or connected to another component, but other components may exist in therebetween. On the other hand, when it is said that a component is "directly coupled" or "directly connected" to another component, it should be understood that no other component is present in the middle.

The terms used in the present application are only used to describe specific embodiments and are not intended to limit the present disclosure. The singular expression includes the plural expression unless the context clearly dictates otherwise. It should be understood that terms such as "comprise" or "have" in the present application do not preclude the possibility of addition or existence of features, numbers, steps, operations, components, parts, or combinations thereof described in the specification in advance.

Unless defined otherwise, all terms used herein, including technical and scientific terms, have the same meaning as commonly understood by one of ordinary skill in the art to which this invention belongs.

Terms such as those defined in a commonly used dictionary should be interpreted as having a meaning consistent with the meaning in the context of the related art and should not be interpreted in an ideal or excessively formal meaning unless explicitly defined in the present application.

Further, each configuration, step, process or method included in each embodiment of the present disclosure may be shared within a range that does not technically contradict each other.

Figure 2:
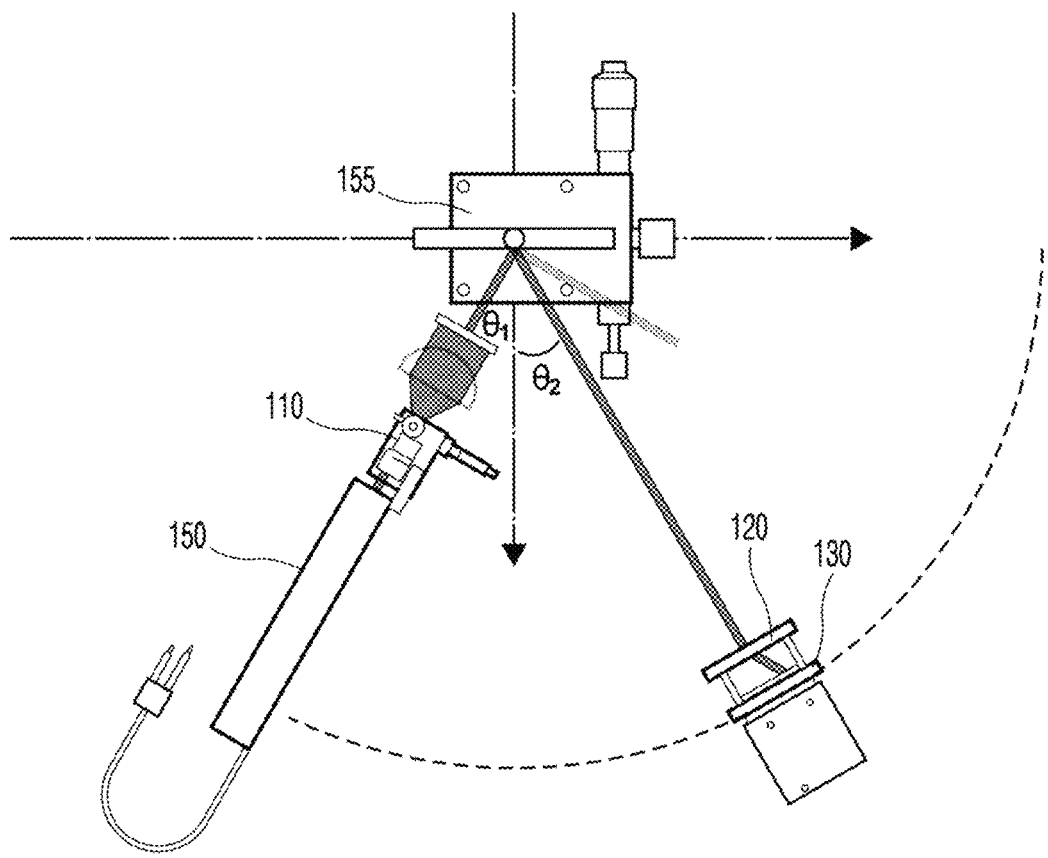

FIGS. 1 and 2 are view showing the configuration of a spatial property measurement device according to an embodiment of the present disclosure.

Referring to FIGS. 1 and 2, the spatial property measurement device 100, according to an embodiment of the present disclosure, comprises a beam width adjusting unit 110, a diffraction element 120, a light receiver 130, a rotation element 140, and a controller (not shown).

The spatial property measurement device 100 measures whether or not the holographic display device is outputting a holographic image to have a specified specification (the spatial property of the holographic image) in the corresponding device, and if not, which element prevents the holographic image from being output. Specifically, the to-be-inspected light source 150a radiates the reference light to the to-be-inspected spatial light modulator 155. The spatial property measuring device 100 receives and analyzes the n-th diffracted light diffracted from the spatial light modulator 155, thereby determining whether or not there is an abnormality in each inspection target and measuring how the spatial property of the output holographic image are if there is no abnormality.

As used herein, holographic image may mean the image formed by the optically reconstructed hologram in the image space.

The beam width adjustment unit 110 adjusts the width of the beam (reference light) irradiated from the light source 150a.

The beam width adjustment unit 110 is disposed at the front end of the light source 150a on the light path irradiated from the light source 150a and adjusts the width of the light irradiated from the light source 150a. The light source 150a may need to irradiate the entire area (width) of the spatial light modulator 155 or only the area (width) of one portion of the spatial light modulator 155. The beam width adjustment unit 110 adjusts the width of the beam irradiated from the light source 150a under the control of a controller.

The diffraction element 120 re-diffracts the light diffracted by the spatial light modulator 155. The diffraction element 120 is implemented as a spatial light modulator with no abnormality and the same modulation pattern as the spatial light modulator 155 or as an (analog) diffraction grating with the same modulation pattern as the spatial light modulator 155. The diffraction element 120 is disposed in front of the light receiver 130 on the light path diffracted by the spatial light modulator 155 and incident to the light receiver 130 and additionally diffracts light diffracted by the spatial light modulator 155.

The light receiver 130 receives and senses the diffracted light from the spatial light modulator 155. The light receiver 130 is implemented as a device that measures the intensity of incident light, such as a charge-coupled device (CCD) or an optical sensor. The light receiver 130 is fixed to one end of the rotation element 140, rotates at a position away from the spatial light modulator 155 by a predetermined distance by the rotation element 140, and measures the intensity of light incident thereon.

The rotation element 140 is fixed to the light receiver 130 at one end and fixed to the spatial light modulator 155 or its periphery at the other end, thereby rotating the light receiver 130. The rotation element 140 rotates the light receiver 130 by a predetermined angle (for example, a predetermined angle within the x-z plane or the x-y plane) from the axis (for example, the x-axis in FIG. 1) of the diffracted light from the spatial light modulator 155 or moves the light receiver 130 away from or closer to the corresponding axis. Accordingly, the rotation element 140 allows the light receiver 130 to sense the amount of light received for each angle at a position separated by a certain distance from the spatial light modulator 155 and to sense the amount of light received each time the distance from the spatial light modulator 155 changes at the same angle.

The controller controls the beam width adjustment unit 110 and the rotation element 140 to determine whether an abnormality has occurred in the inspection target from the sensed value sensed by the light receiver 130 and the spatial property of the output holographic image.

The controller controls the rotation element 140 so that the light receiver 130 may acquire the amount of light received for each angle at a position separated by each distance from the spatial light modulator 155. The controller rotates the light receiver 130 at a location away from the spatial light modulator 155 by a predetermined distance. Accordingly, the light receiver 130 may obtain the sensed value shown in FIG. 3.

Figure 3:
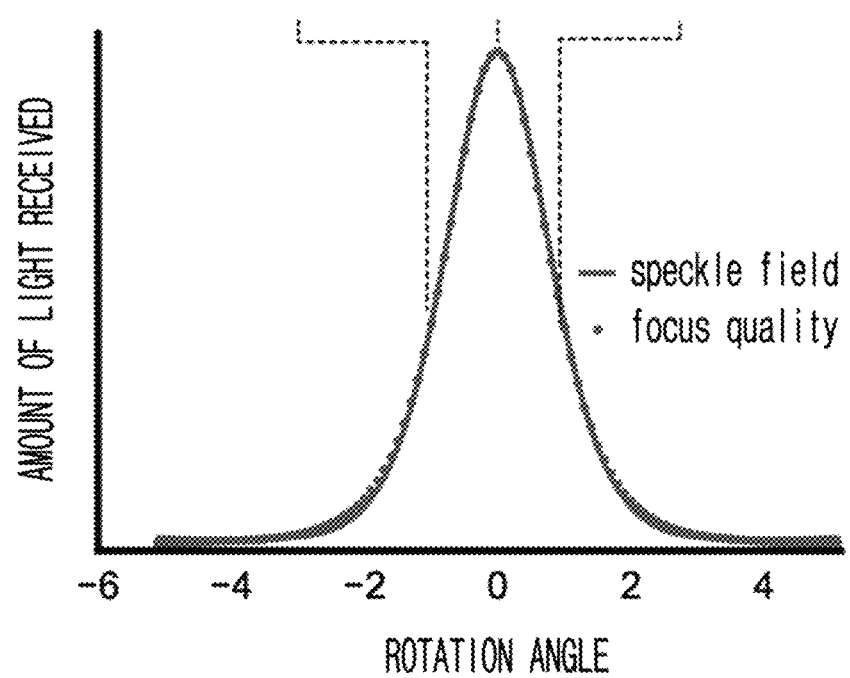
FIG. 3 is a graph of the amount of light received according to an angle measured at a predetermined distance by a light receiver according to an embodiment of the present disclosure.

FIG. 3 is a graph of the amount of light received according to an angle measured at a predetermined distance by a light receiver according to an embodiment of the present disclosure.

Referring to FIG. 3, light incident to the spatial light modulator 155 is diffracted, generating one or more diffracted lights. The diffraction angle is determined as follows according to the modulation pattern formed by the spatial light modulator 155.

$$n_2 \sin\theta_2 = n_1 \sin\theta_1 + \frac{m\lambda}{\Lambda}$$

Here, $n_1$ and $n_2$ represent the refractive index of the medium through which the incident light and diffracted light pass, $\theta_1$ represents the incident angle, $\theta_2$ represents the diffraction angle, m represents the order of the diffracted light, $\lambda$ represents the wavelength of the light used, and $\Lambda$ represents the spatial frequency within the spatial light modulator.

Accordingly, the n-th diffraction light diffracted in the spatial light modulator 155 and having a specific modulation pattern has a calculated diffraction angle. When the light receiver 130 is positioned at the corresponding diffraction angle, the largest amount of light received is shown. As the light receiver 130 moves away from the corresponding diffraction angle, the amount of light received gradually decreases. As such, the controller controls the rotation element 140 to check the diffraction angle using the sensed value of the light receiver 130.

However, as shown in FIG. 3, when the sensed value by the light receiver 130 is much larger than the surroundings at the diffraction angle, no problem occurs. However, the beam width of the light irradiated from the light source 150a is relatively small. Accordingly, although it is possible to recognize that light is incident within a certain angle range, it is difficult to recognize that the largest (diffracted) light is incident at a specific angle with a clear resolution, as shown in FIG. 3.

In order to address these issues, the diffraction element 120 is disposed at the front end of the light receiver 130 in a direction in which light enters the light receiver 130. As described above, the diffraction element 120 re-diffracts the diffracted light incident on the light receiver 130. A light path diffracted by the diffraction element 120 is shown in FIG. 4.

Figure 4:
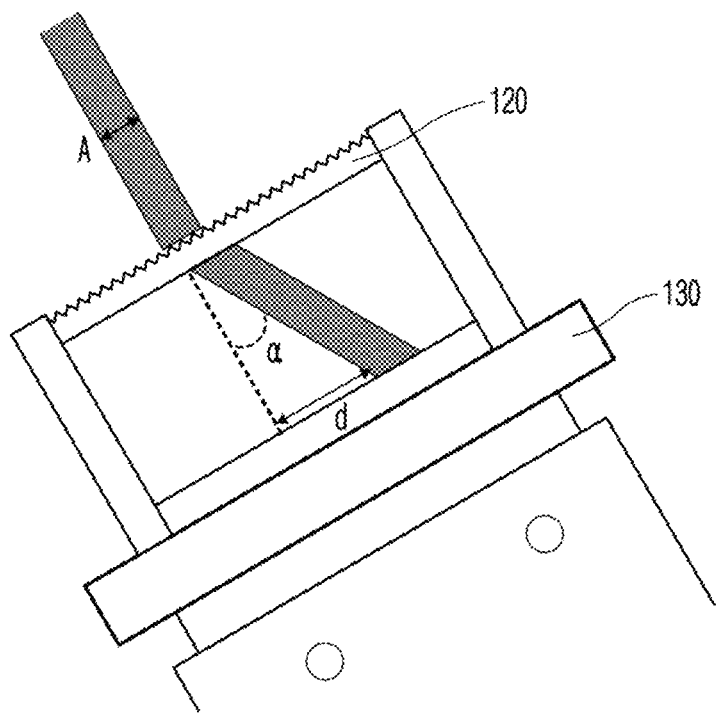
FIG. 4 is an enlarged view of a diffraction element and a light receiver according to an embodiment of the present disclosure.

FIG. 4 is an enlarged view of a diffraction element and a light receiver according to an embodiment of the present disclosure.

The light incident to the diffraction element 120 is diffracted again by an angle α at the diffraction element 120 and is incident to the light receiver 130.

In this case, assuming that light has a width or area of A and proceeds like a solid line without any abnormalities, the light is diffracted through the diffraction element 120 and increases to the width or area of A/cos α in the light receiver 130. Depending on the angle diffracted by the diffraction element 120, the diffracted light incident on the light receiver 130 (re-diffracted by the diffraction element) may be expanded by a significant ratio. Accordingly, the controller may more easily sense the diffraction angle by checking the maximum point of the sensed value.

Figure 5:
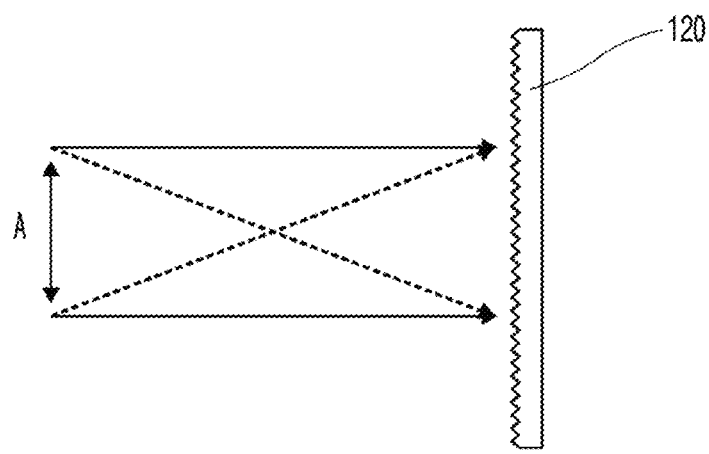
FIG. 5 is a view illustrating various examples of travel paths of a short-wavelength light source such as a laser.

Further, the diffraction element 120 is disposed in the above-described position to distinguish situations, as shown in FIG. 5.

FIG. 5 is a view illustrating various examples of travel paths of a short-wavelength light source, such as a laser.

There may be cases in which the light from the light source 150a has the beam width A and is output without any abnormality, as the light shown by the solid line in FIG. 5, but an abnormality occurs in the light source 150a as shown in the dotted line, and the light having the beam width A but cross-progressing light may exist.

Both cannot be distinguished when only the light receiver receives the diffracted light as in the prior art. Meanwhile, when the diffraction element 120 is disposed at the front end of the light receiver 130, both diffraction angles are different through the diffraction element 120, and the area sensed by the light receiver 130 is different. The controller may compare the sensed area with the area (width) of light output from the light source 150a to determine whether an abnormality has occurred in the light source 150a.

Figure 6:
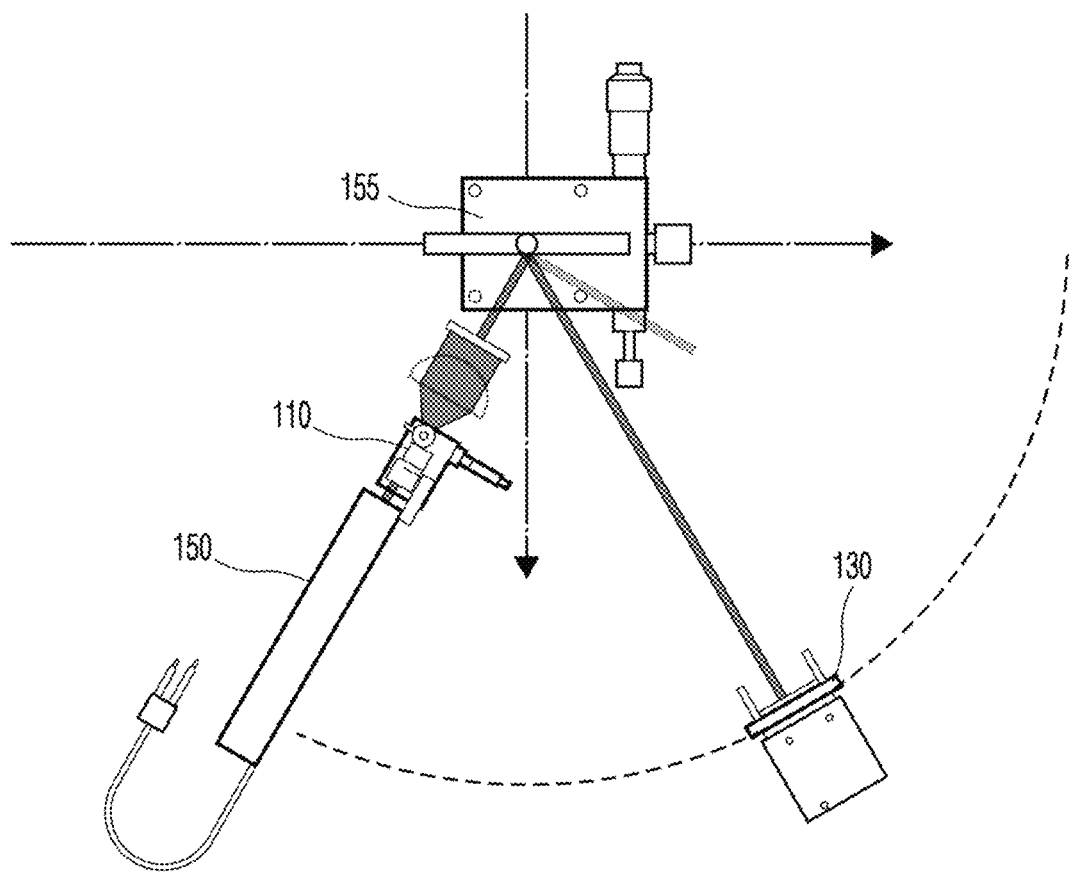
FIG. 6 is a view illustrating a process of measuring whether or not an abnormality exists in a light source by a spatial property measurement device according to an embodiment of the present disclosure.

Referring back to FIGS. 1 and 2, the controller controls the rotation element 140, the light source 150a, and the spatial light modulator 155, as shown in FIG. 6, thereby determining whether an abnormality has occurred in the light source 150a.

FIG. 6 is a view illustrating a process of measuring whether or not an abnormality exists in a light source by a spatial property measurement device according to an embodiment of the present disclosure.

Referring to FIG. 6, the controller controls the spatial light modulator 155 to have no modulation property in a state where the diffraction element 120 is not disposed. Accordingly, the spatial light modulator 155 operates as a simple mirror. In this situation, the controller irradiates light from the light source 150a and controls the rotation element 140 to rotate at a certain distance. In this case, when there is no abnormality in the light source 150a, the sensed value of the light receiver 130 should be the largest at the calculated angle, as described above. If the sensed value of the light receiver 130 is the largest in the diffraction angle, the controller may determine that there is no abnormality in the light source 150a. However, if the sensed value of the light receiver 130 is not the largest in the diffraction angle, the controller that there is an abnormality in the light source 150a.

When the light source 150a irradiates light as much as a certain area (width), the light receiver 130 must also receive light as much as an area within a predetermined error range from the certain area. Otherwise, it may be confirmed that the light irradiated from the light source 150a is irradiated in an excessively dispersed, manner unlike the design.

As such, the controller controls the light source 150a and the spatial light modulator 155 as described above, thereby detecting an abnormality of the light source 150a for various reasons. For example, the light source 150a is not irradiating at the set angle, or a certain element in the light source 150a has optical property different from the designed specifications.

Figure 7A:
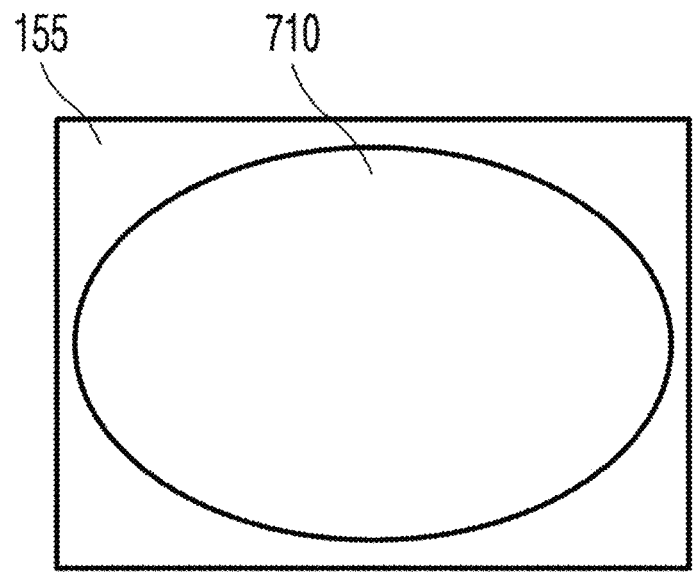
FIGS. 7A and 7B are views illustrating a process of measuring whether an abnormality exists in a spatial light modulator by a spatial property measurement device according to an embodiment of the present disclosure.
Figure 7B:
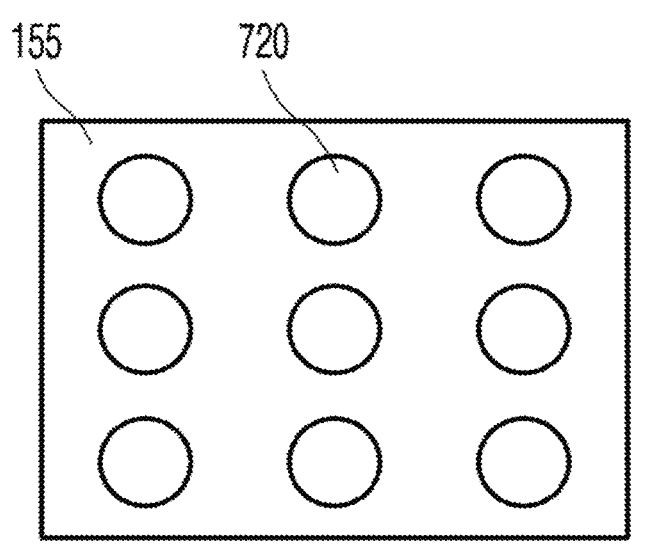

Referring back to FIGS. 1 and 2, the controller controls the beam width adjustment unit 110 and the rotation element 140 to determine if there is an abnormality in the spatial light modulator 155, as shown in FIGS. 7A and 7B.

FIGS. 7A and 7B are views illustrating a process of measuring whether an abnormality exists in a spatial light modulator by a spatial property measurement device according to an embodiment of the present disclosure.

The controller controls the beam width adjustment unit 110 so that light is incident on most of the area (710, an area equal to or greater than a predetermined ratio) of the spatial light modulator 155, as shown in FIG. 7A. The controller obtains a sensing value of the light receiver 130 by the irradiated light.

Meanwhile, the controller controls the beam width adjustment unit 110 to have a relatively narrow area (720, area less than a predetermined ratio) than in the case of FIG. 7A, as shown in FIG. 7B. The controller controls beams having a relatively narrow area to be irradiated to arbitrary positions of the spatial light modulator 155. The controller compares the sensed value at each irradiated position with the sensed value at each position among the sensed values when light is incident on the entire area of the spatial light modulator 155, as shown in FIG. 7A. When both are perfectly matched, it can be confirmed that there is no abnormality in the modulation state at each position in the spatial light modulator 155. Meanwhile, the sensed value at a specific position differs from the sensed value at a specific position among the sensed values of the entire area, and it can be confirmed that the corresponding position in the spatial light modulator 155 does not have a design modulation state.

Referring back to FIGS. 1 and 2, the controller controls the rotation element 140 to measure the spatial property of a holographic image output from a holographic display device. A process of measuring by a controller is shown in FIGS. 8, 9, 10, 11, 12, 13, 14, 15, 16, and 17.

Figure 8:
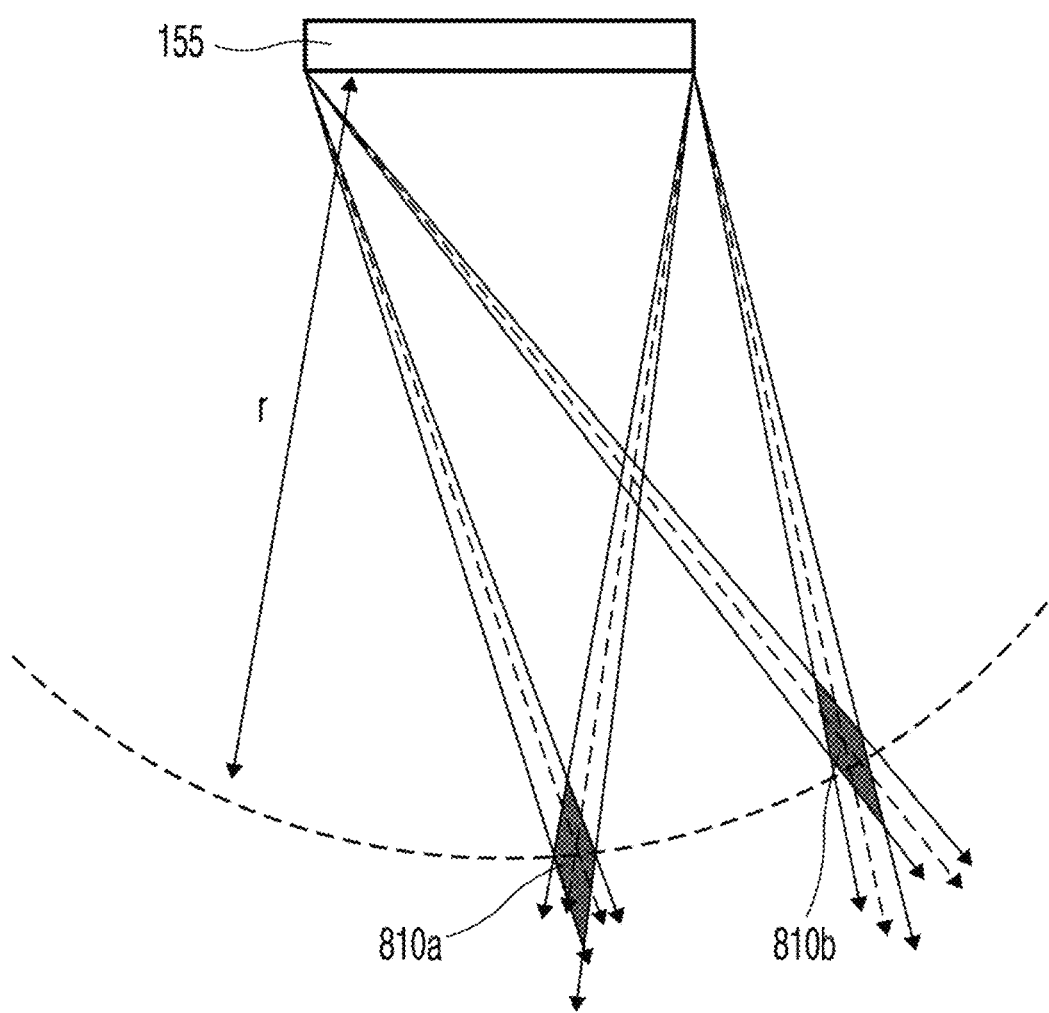
FIG. 8 is a view illustrating the size and shape of a voxel formed by light diffracted from a spatial light modulator over a certain distance.

FIG. 8 is a view illustrating the size and shape of a voxel formed by light diffracted from a spatial light modulator over a certain distance.

When a specific point is expressed at a certain distance, the light diffracted by the spatial light modulator 155 must be focused on the corresponding point. However, if it is not an ideal light source, a Rayleigh depth region is formed, and the focus is not fully achieved. Accordingly, a voxel 810 having a certain volume is formed at a location away from the spatial light modulator 155 by a predetermined distance r. The volume of a voxel varies with angle even at the same distance r.

The size of the voxel 810 affects the resolution at a corresponding distance, and as the size of the voxel 810 increases based on the same resolution, crosstalk occurs between adjacent voxels, deteriorating spatial property. Accordingly, the area of the sensed value by the light receiver 130 for each distance corresponds to an important factor in determining spatial property.

In this way, in order to measure the spatial property of the holographic image, the controller controls the rotation element 140 to change the angle at a predetermined distance r, and allows the light receiver 130 to obtain the sensing value, in which the distance from the spatial light modulator 155 is changed so that the light receiver 130 may obtain the sensed value for each angle.

Figure 9:
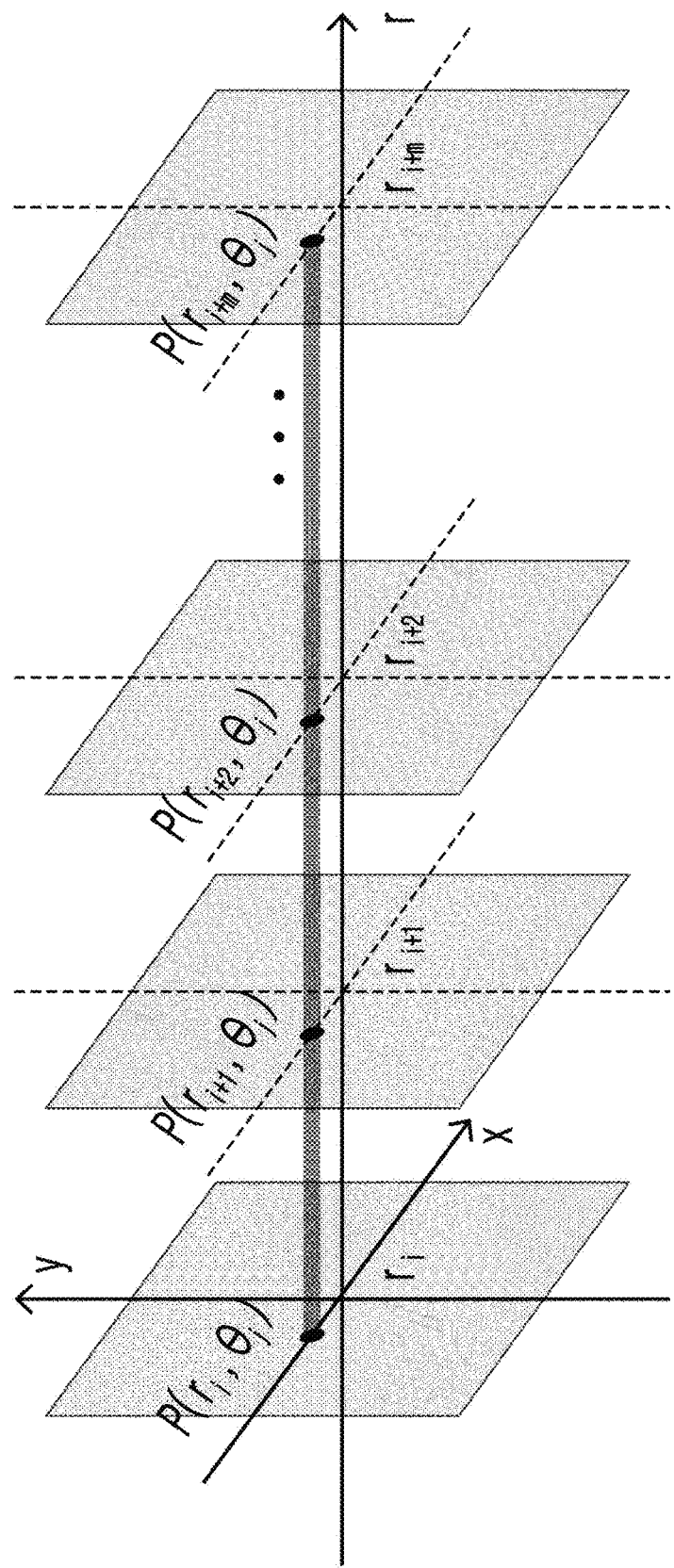
FIG. 9 is a view illustrating a path of light received according to the operation of an ideal light source and spatial light modulator.
Figure 10:
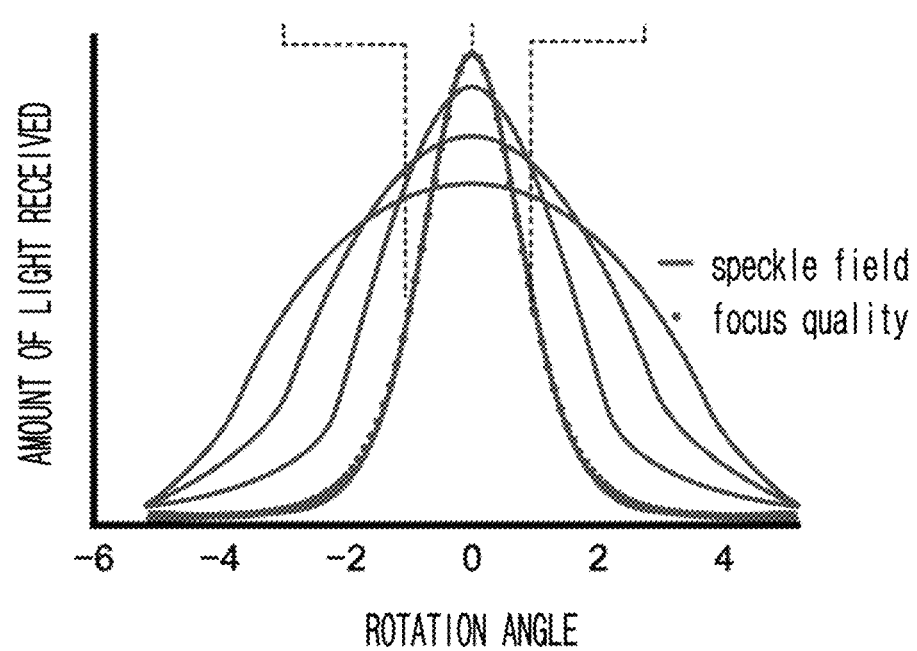
FIG. 10 is a graph of amount of light received according to distance measured by a light receiver according to the operation of an ideal light source and spatial light modulator.

In the case of an ideal light source 150a and a spatial light modulator 155, results as shown in FIGS. 9 and 10 are obtained.

FIG. 9 is a view illustrating a path of light received according to the operation of an ideal light source and spatial light modulator, and FIG. 10 is a graph of the amount of light received according to the distance measured by a light receiver according to the operation of an ideal light source and spatial light modulator.

Light output from an ideal light source is not dispersed and is output according to the designed optical axis. Further, an ideal spatial light modulator diffracts the incident light according to the design angle.

Accordingly, as shown in FIGS. 9 and 10, although the distance between the spatial light modulator 155 and the light receiver 130 is changed by the rotation element 140, the point having the strongest light amount (for example, sensed value) of the diffracted light (hereinafter referred to as 'center coordinates') should be measured at the same angle. Further, although the aforementioned distance is changed, all areas sensed by the light receiver 130 must be the same.

Figure 11:
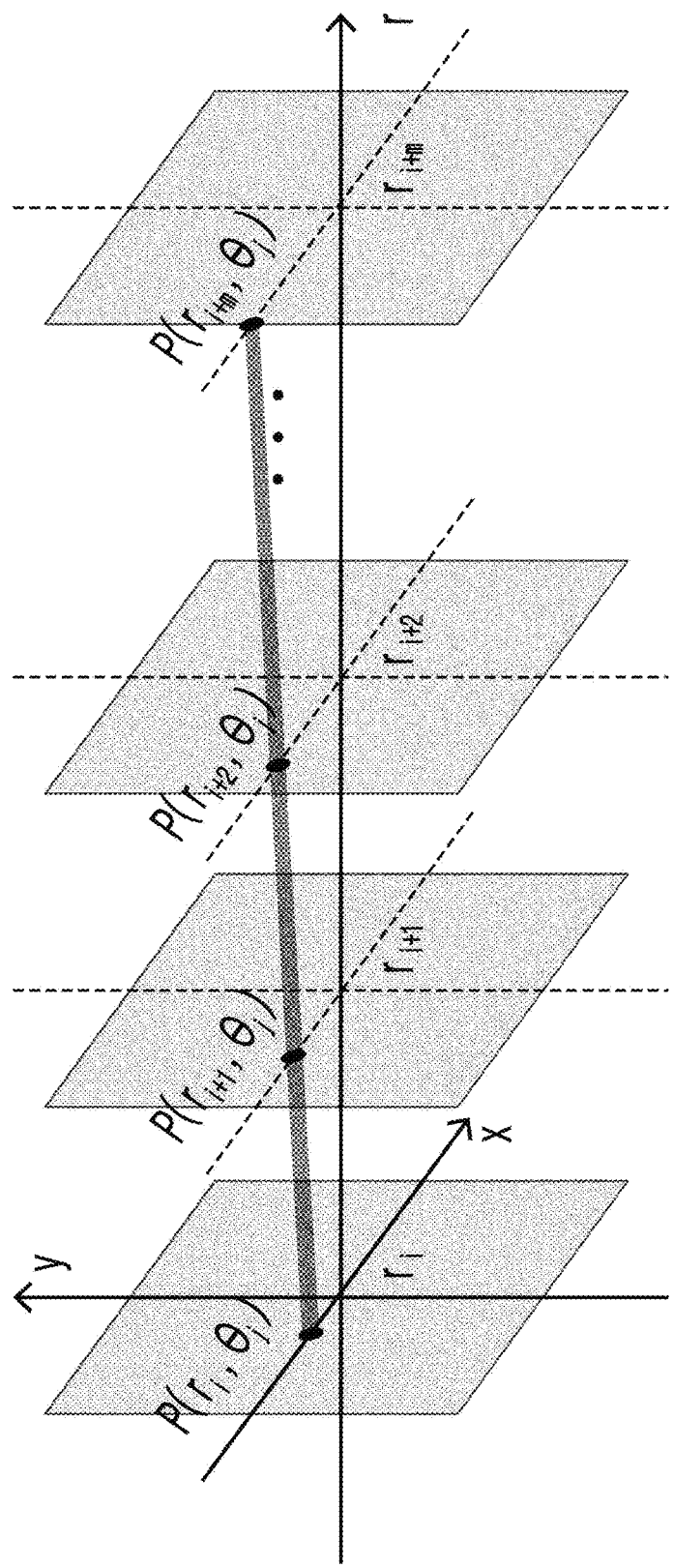
FIG. 11 is a view illustrating a path of light received when a spatial light modulator is physically distorted.
Figure 12:
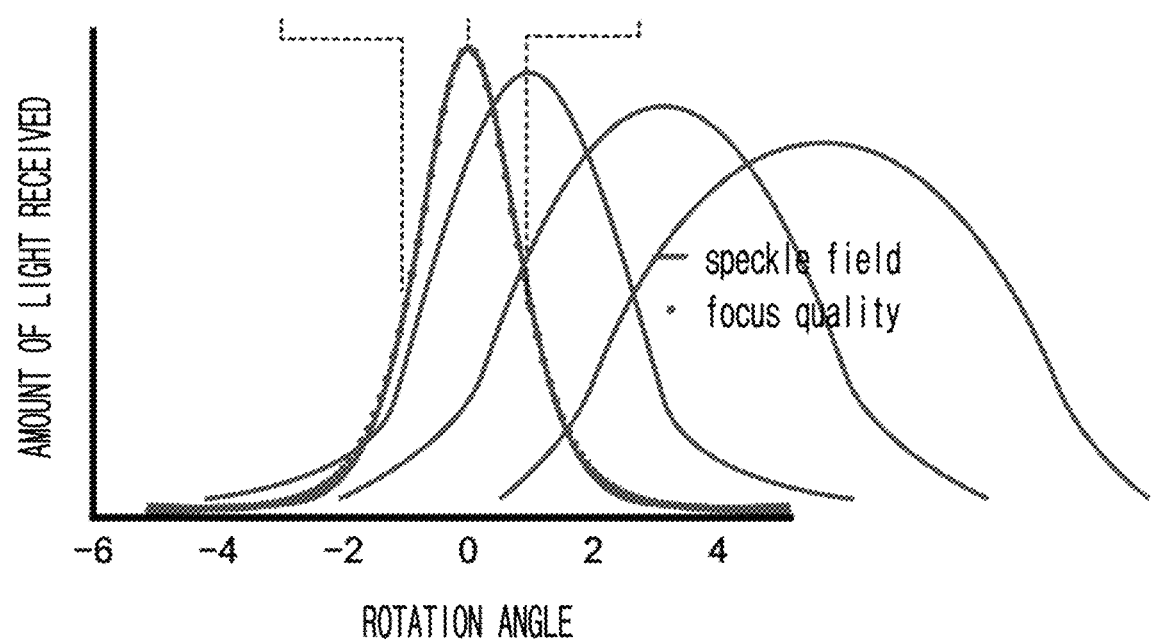
FIG. 12 is a graph of the amount of light received according to distance measured by a light receiver when a spatial light modulator is physically distorted.

However, when there is a problem with the light source, such as the optical axis of the light source 150a being distorted or the light source 150a being displaced, or when the spatial light modulator 155 is not arranged according to the design angle and is physically displaced, the results shown in FIGS. 11 and 12 are derived.

FIG. 11 is a view illustrating a path of light received when a spatial light modulator is physically distorted, and FIG. 12 is a graph of the amount of light received according to the distance measured by a light receiver when a spatial light modulator is physically distorted.

Referring to FIGS. 11 and 12, when the distance between the spatial light modulator 155 and the light receiver 130 is changed by the rotation element 140, the center coordinates of the diffracted light are measured at different angles. When the light source 150a is abnormal, the controller measures it from the process described with reference to FIG. 6. On the other hand, when the spatial light modulator 155 is abnormal, the controller obtains the results of FIGS. 11 and 12 to confirm that the spatial light modulator 155 is not arranged as designed but is physically distorted. In this case, spatial distortion occurs in the holographic image to be finally output.

Meanwhile, as described above, voxels having a constant volume are inevitably formed at constant distances. Due to this issue, the results shown in FIGS. 13 and 14 are derived.

Figure 13:
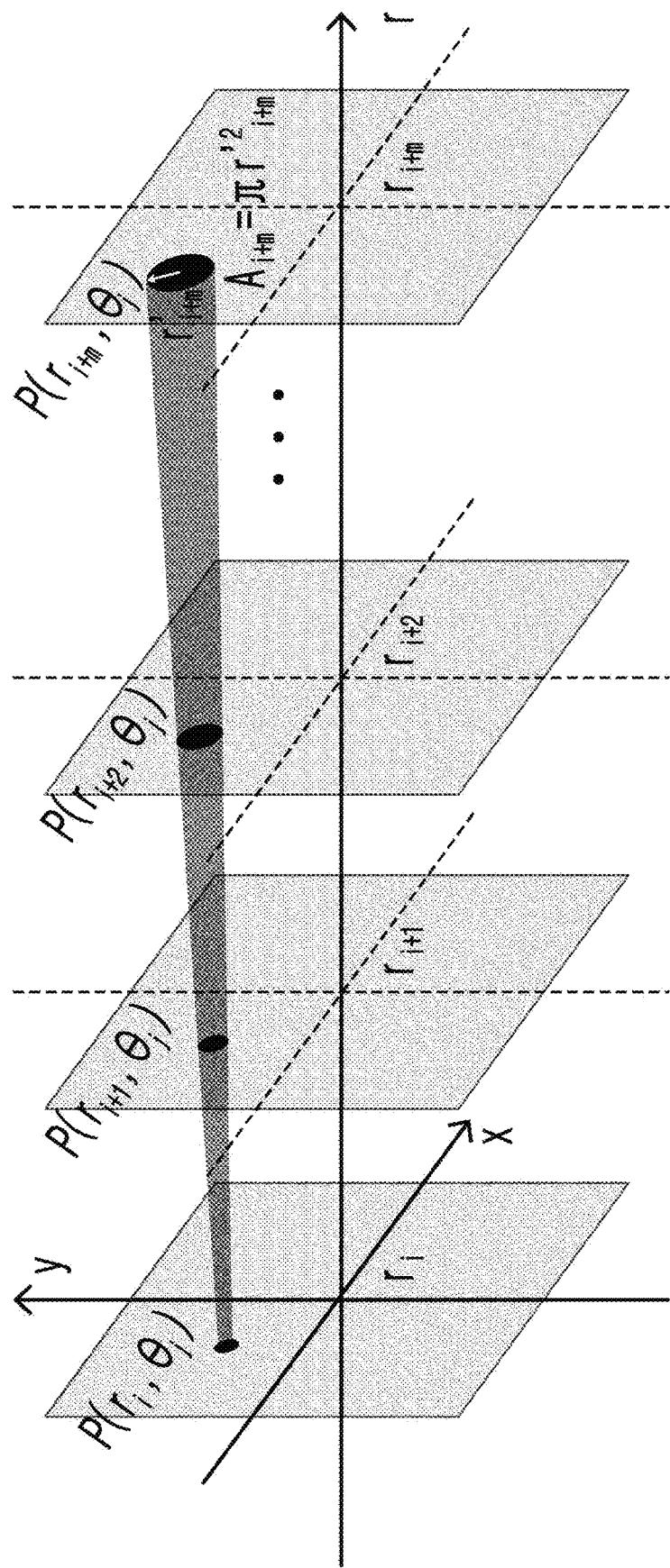
FIG. 13 is a view illustrating an area of light received according to a distance.
Figure 14:
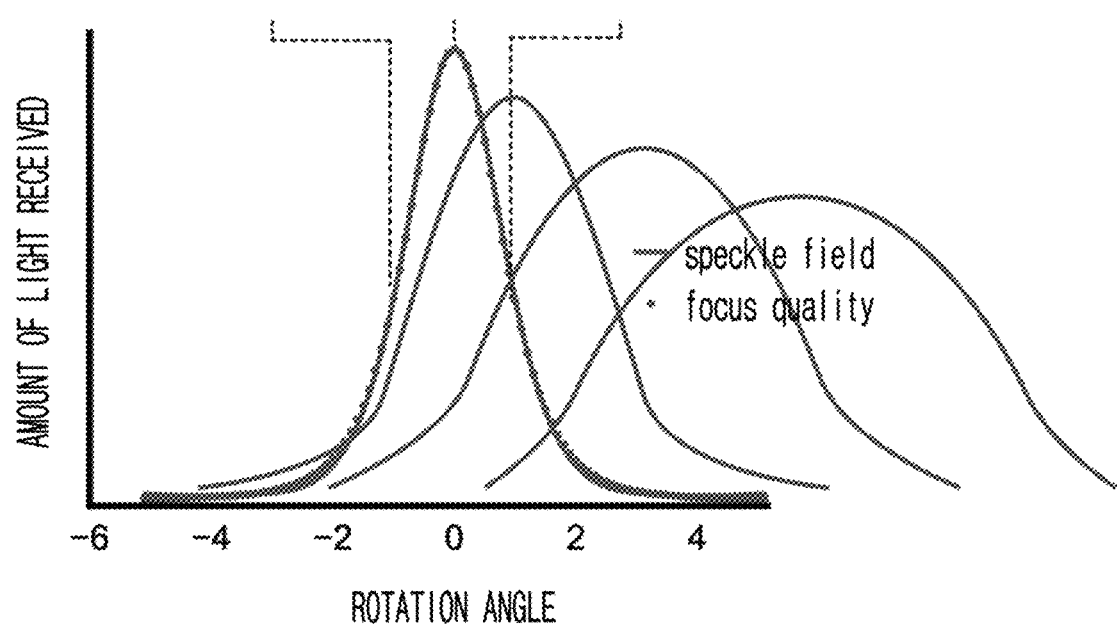
FIG. 14 is a graph of the amount of light received according to distance, measured by a light receiver in a case where the area of light varies according to distance.

FIG. 13 is a view illustrating an area of light received according to a distance, and FIG. 14 is a graph of the amount of light received according to distance, measured by a light receiver in a case where the area of light varies according to distance.

Referring to FIGS. 13 and 14, preventing light from being dispersed is inevitably impossible. Therefore, as the distance between the spatial light modulator 155 and the light receiver 130 increases by the rotation element 140, the area of the diffracted light sensed by the light receiver 130 increases. Since the size (volume) of the voxel for each distance may be calculated, the degree of crosstalk and the resolution at the corresponding distance may be calculated. Based on this, it can be measured whether the holographic display device may provide an image with a specific resolution level without distortion at a certain distance.

Further, the controller may additionally measure whether any problem exists in the spatial light modulator according to the angular change state of the center coordinate of the sensed value according to the distance.

FIGS. 15A, 15B, 16A, 16B, 17A, and 17B are views showing changes in the center coordinates of light received by the light receiver according to a distance.

Figure 15A:
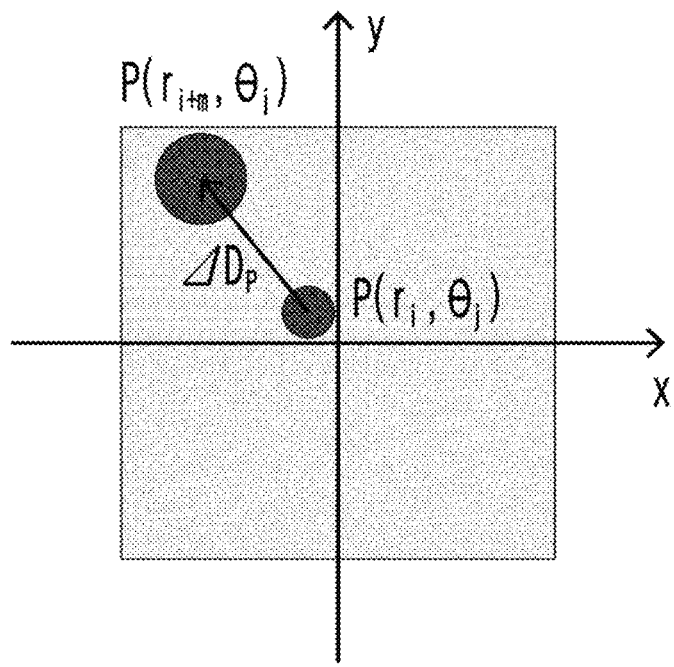
FIGS. 15A, 15B, 16A, 16B, 17A, and 17B are views showing changes in the center coordinates of light received by the light receiver according to a distance.

As shown in FIG. 15A, the center coordinate of the received light changes linearly according to the distance, confirming that the light source 150a does not output light at the designed angle or that the spatial light modulator 155 is physically distorted and disposed.

Figure 15B:
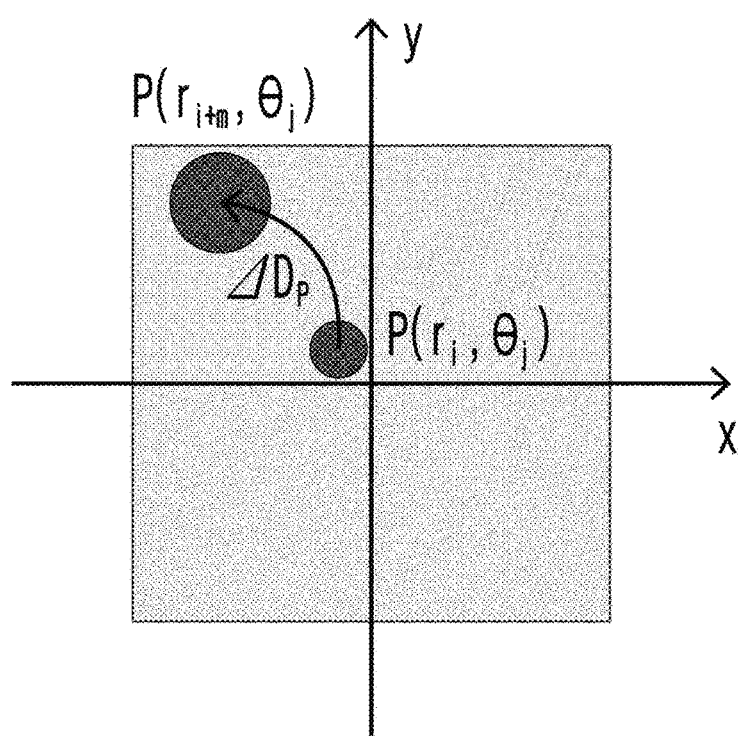

However, as shown in FIG. 15B, when the center coordinate of the received light changes according to the distance but changed nonlinearly, it can be confirmed that the spatial light modulator 155 does not diffract the light at the designed diffraction angle in addition to the above issue.

Figure 16A:
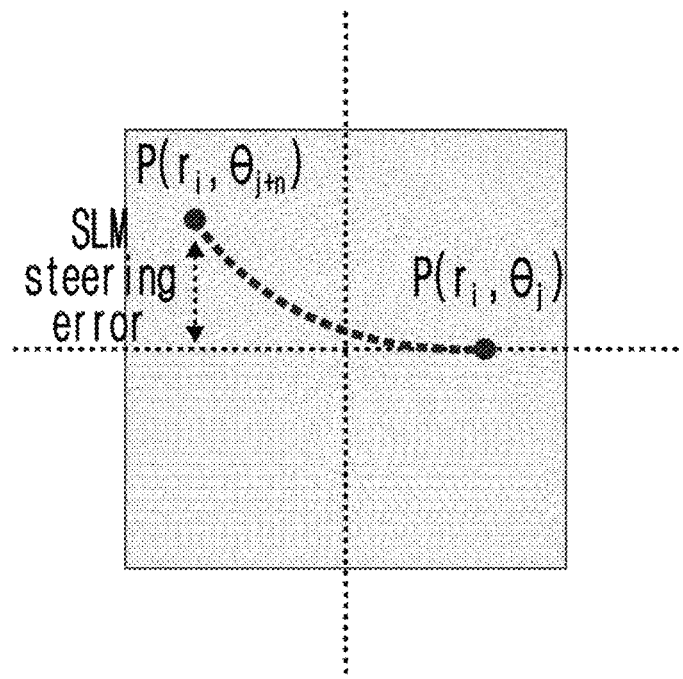
Figure 16B:
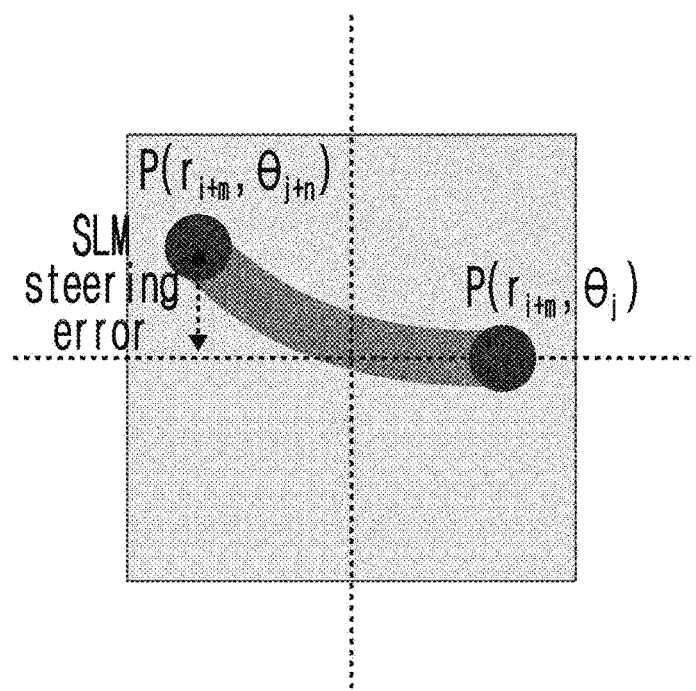
Figure 17A:
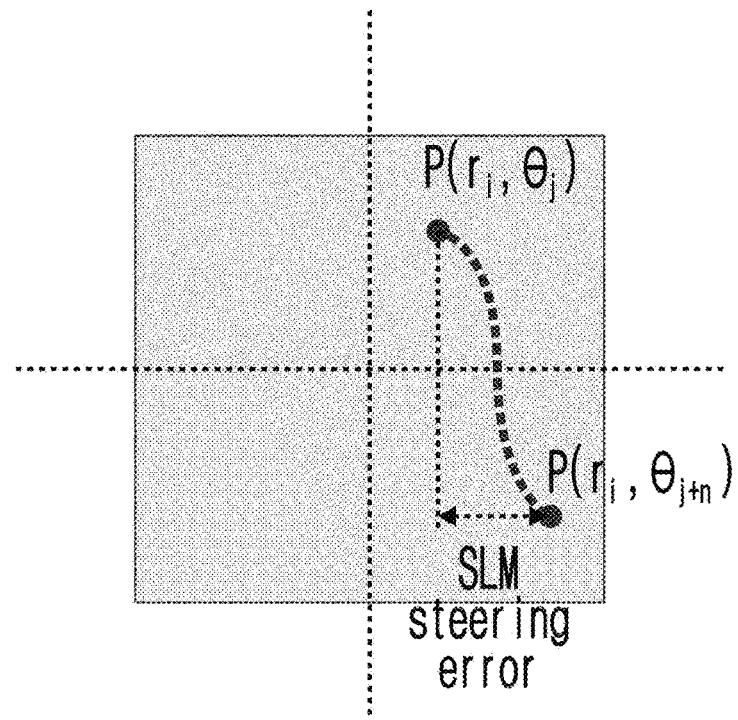
Figure 17B:
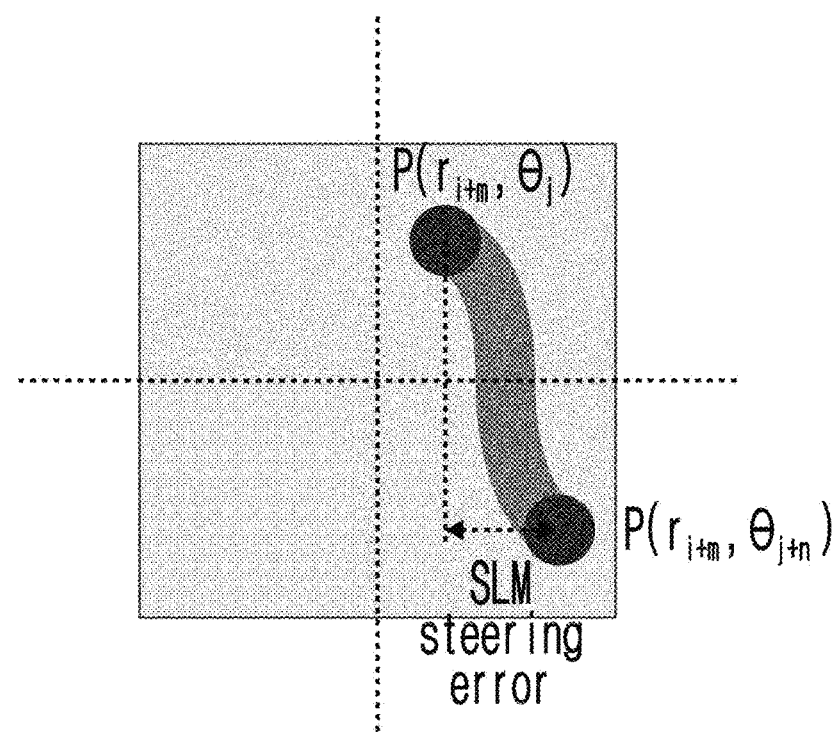
Figure 18A:
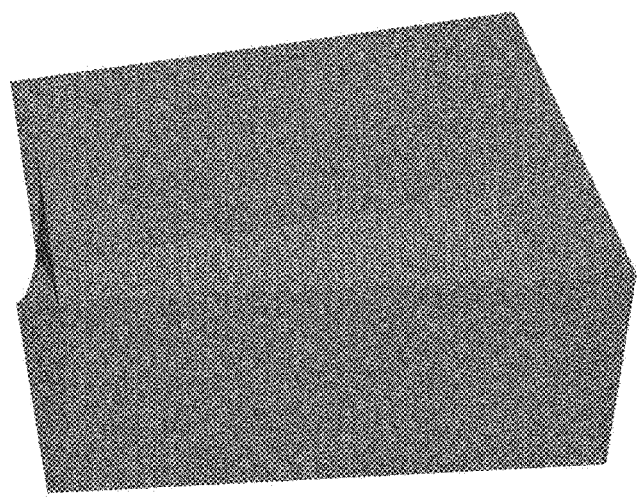
FIGS. 18A, 18B, 19A, and 19B are views illustrating spatial property of an original to be output by a holographic display device and a holographic image measured by a spatial property measurement device according to an embodiment of the present disclosure.
Figure 18B:
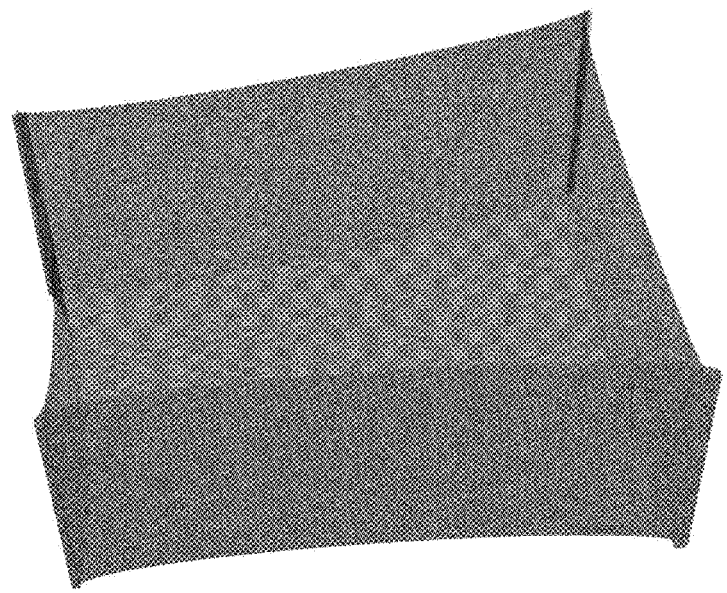
Figure 19A:
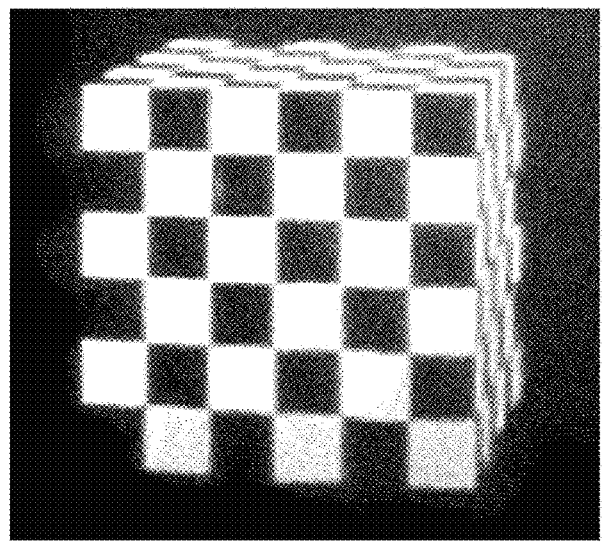
Figure 19B:
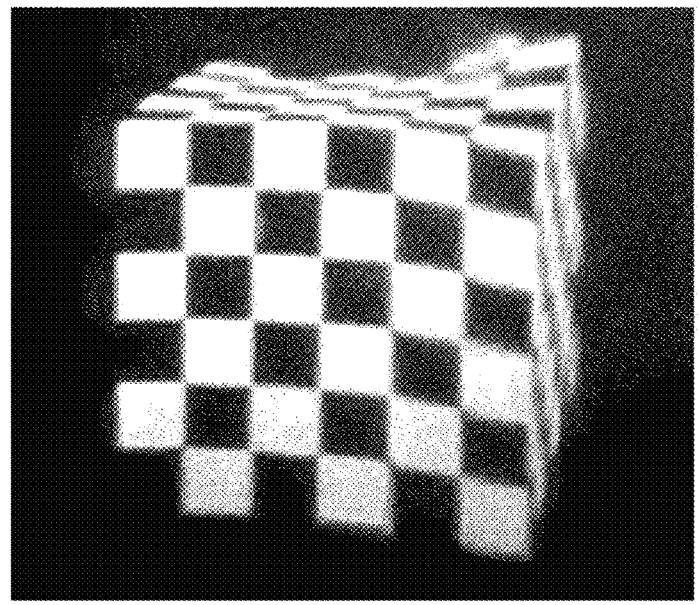

As shown in FIGS. 16A, 16B, 17A, and 17B, when the diffraction of the spatial light modulator 155 is defective, the degree of diffraction defect (of spatial light modulator 155) may be confirmed from the difference between the sensed value at the closest distance and the sensed value at the farthest distance among the sensed values. For example, as shown in FIGS. 16A and 16B, when the rotation element 140 rotates on the x-y plane, the controller may determine the degree of diffraction defect based on how much (angle) the difference between the sensed value at the closest distance and the sensed value at the farthest distance based on the x-y plane is.

Based on the above process by the controller, spatial property of the holographic image may be measured as shown in FIGS. 18A, 18B, 19A, and 19B.

FIGS. 18A, 18B, 19A, and 19B are views illustrating spatial property of an original to be output by a holographic display device and a holographic image measured by a spatial property measurement device according to an embodiment of the present disclosure.

Referring to FIGS. 18A, 18B, 19A, and 19B, spatial distortion may occur in a holographic image output by the holographic display device. The spatial property measurement device 100 measures that spatial distortion may occur, and the device may distinguish whether the issue is caused by an abnormality in the light source 150a itself, whether it is caused by an abnormality in the modulation property in the spatial light modulator 155, whether it is caused by an abnormality in the arrangement of the spatial light modulator 155, or whether the diffraction property of the spatial light modulator 155 is not perfect.

Figure 20:
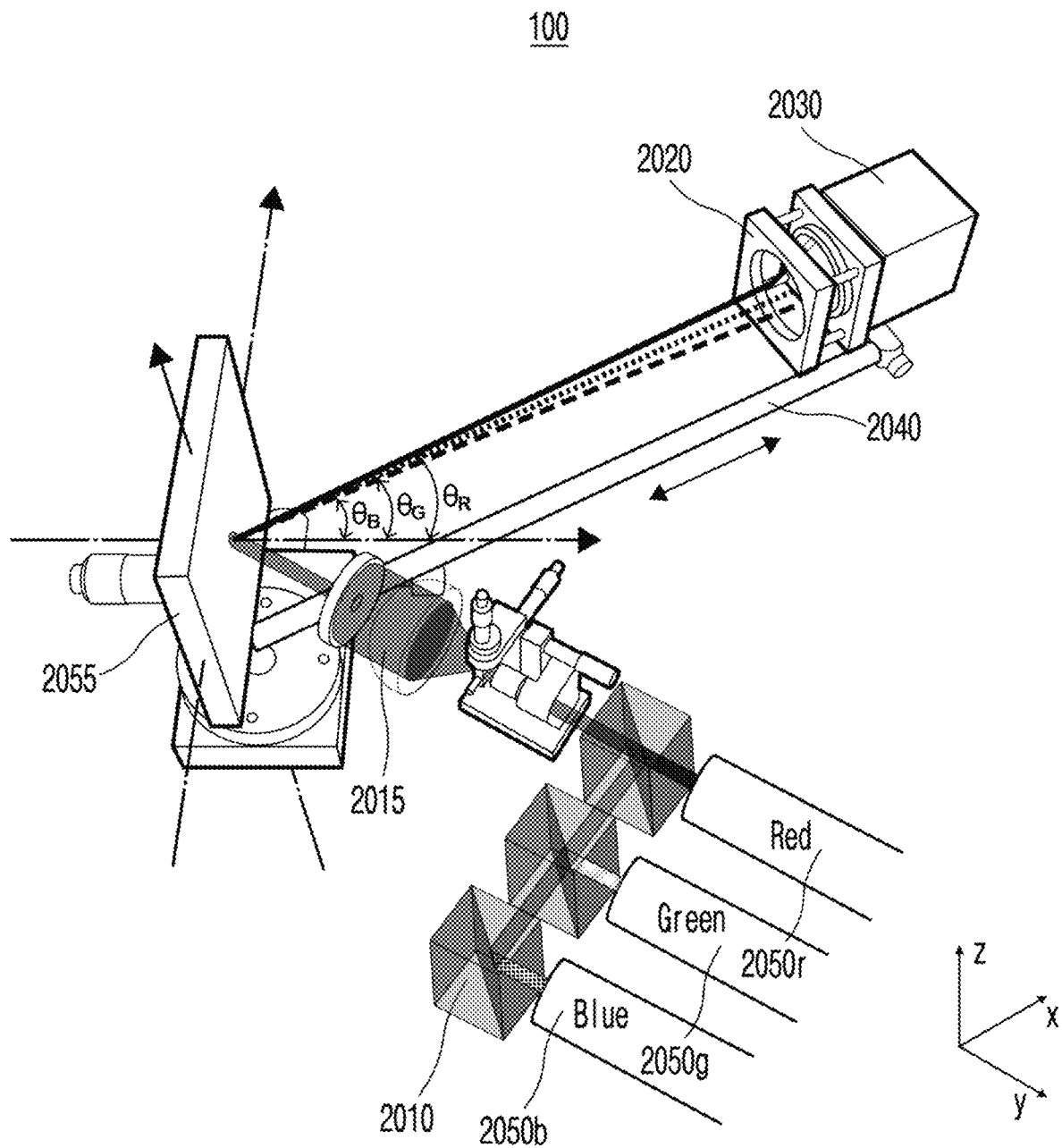
FIGS. 20 and 21 are views showing the configuration of a color implementation property measurement device according to an embodiment of the present disclosure.
Figure 21:
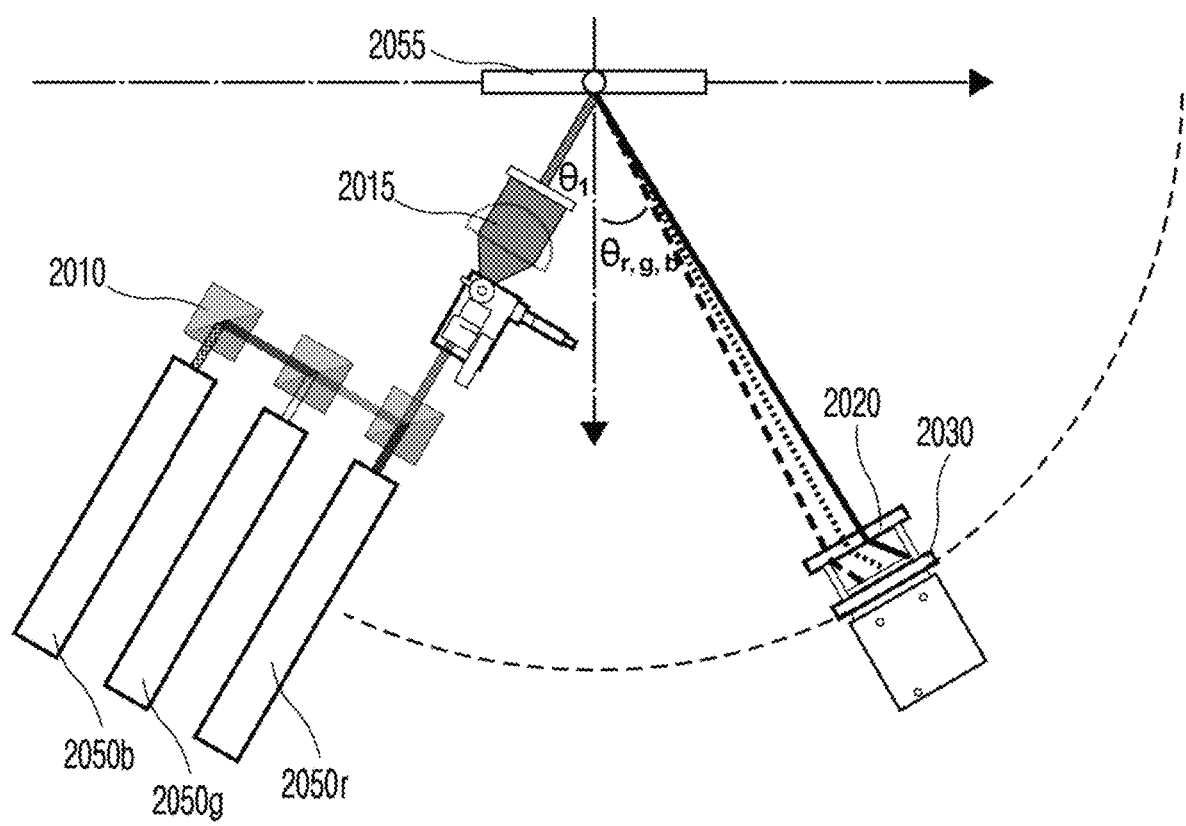

FIGS. 20 and 21 are views showing the configuration of a color implementation property measurement device according to an embodiment of the present disclosure.

Referring to FIGS. 20 and 21, the color implementation property measurement device 2000, according to an embodiment of the present disclosure, comprises an optical path adjustment unit 2010, a beam width adjustment unit 2015, a diffraction element 2020, and a light receiver 2030, a rotation element 2040, and a controller. The beam width adjustment unit 2015, the diffraction element 2020, and the rotation element 2040, respectively, operate in the same way as the beam width adjustment unit 110, the diffraction element 120, the rotation element 140, and the repeated descriptions are excluded.

The color implementation property measurement device 2000 measures whether the holographic display device is outputting a holographic image to have the specifications (color implementation property of the holographic image) set in the corresponding device and, if not, which element causes the output to fail. More specifically, the light source 2050 to be inspected irradiates reference light in each wavelength band to the spatial light modulator 2055 to be inspected. The color implementation property measurement device 2000 receives and analyzes the m-th diffraction light diffracted from the spatial light modulator 2055, thereby determining whether there are any abnormalities in each inspection target or whether, if there is no abnormality, the color implementation property of the output holographic image is.

In particular, the light source 2050 to be inspected irradiates light in an ultra-narrow band different from the standard light source. Here, the light source 2050 outputs ultra-narrowband light having a bandwidth of several nm or several tens of nm based on red (R), green (G), and blue (B) central wavelengths. The color implementation property measurement device 2000 may measure what color rendition of the holographic image by short-wavelength light irradiated at each distance, how much resolution it can have accordingly, or how much color crosstalk it has.

The optical path adjustment unit 2010 is disposed at the front end of some or all of the light sources 2050g and 2050b on the light path irradiated from the light source 2050, thereby adjusting the path so that the light irradiated from each light source 2050 travels the same path. The optical path adjustment unit 2010 includes a mirror or a beam splitter so that light in different wavelength bands travels through the same path.

The light receiver 2030 receives and senses the diffracted light from the spatial light modulator 2055. The light receiver 2030 is implemented with a device that measures the intensity of incident light, such as a charge-coupled device (CCD) or an optical sensor. The light receiver 2030 is fixed to one end of the rotation element 2040, rotates at a position separated by a predetermined distance from the spatial light modulator 2055 by the rotation element 2040 and measures the intensity of light incident on it. The light receiver 2030 measures the intensity of light of each incident wavelength band to calculate the CIE color coordinates of each wavelength band. When the intensities of incident red (R), green (G), and blue (B) lights are different, humans perceive colors differently. Based on this, the light receiver 2030 measures the intensity of light in each wavelength band to calculate the CIE color coordinates of each wavelength band.

The controller controls the beam width adjustment unit 2015 and the rotation element 2040 to determine whether an abnormality has occurred in the inspection target based on the sensing value sensed by the light receiver 2030 and the color implementation property of the holographic image output.

A controller controls the rotation element 2040 to acquire the amount of light received for each angle at a position separated by each distance from the spatial light modulator 2055. The controller operates as described above with reference to FIG. 3 and allows the light receiver 2030 to sense the amount of light received for each angle.

Meanwhile, the diffraction element 2020 is disposed at the front end of the light receiver 2030 in a direction in which light enters the light receiver 2030.

Figure 22A:
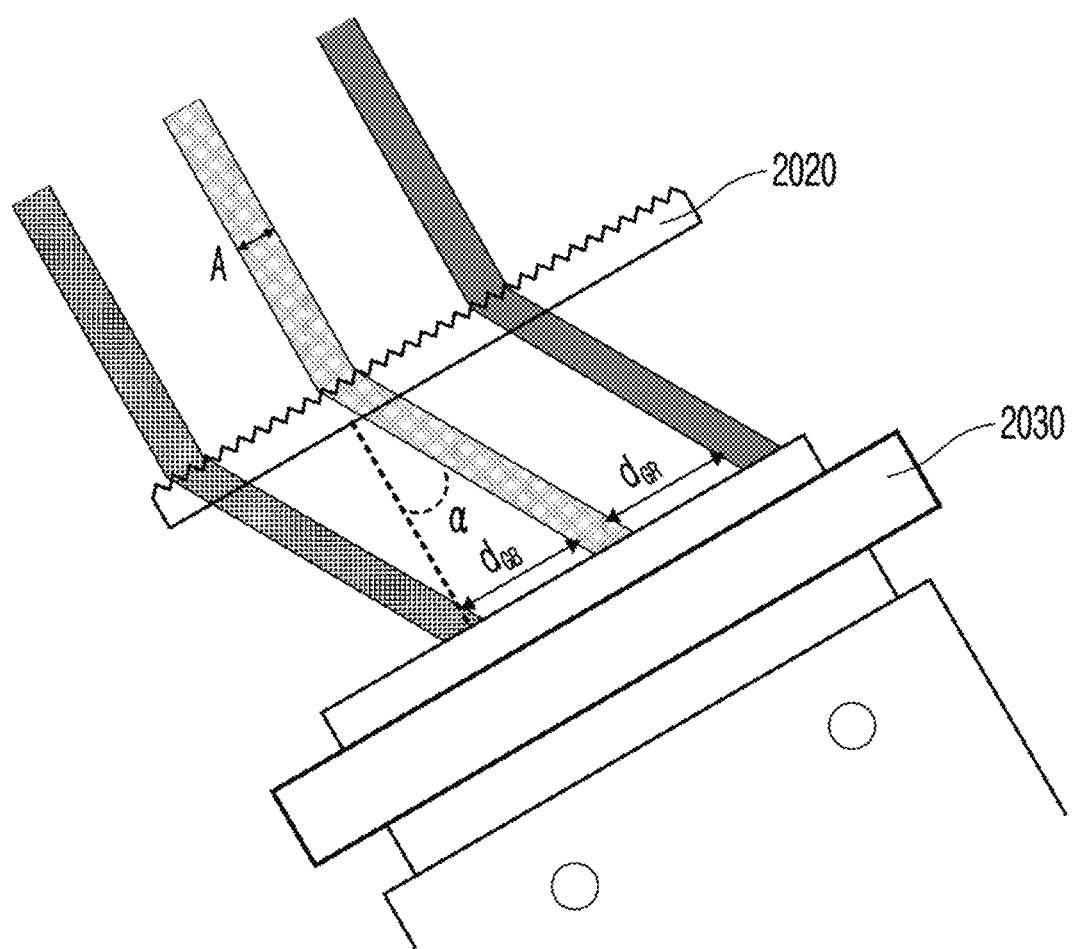
FIGS. 22A and 22B are enlarged views of a diffraction element and a light receiver according to an embodiment of the present disclosure.
Figure 22B:
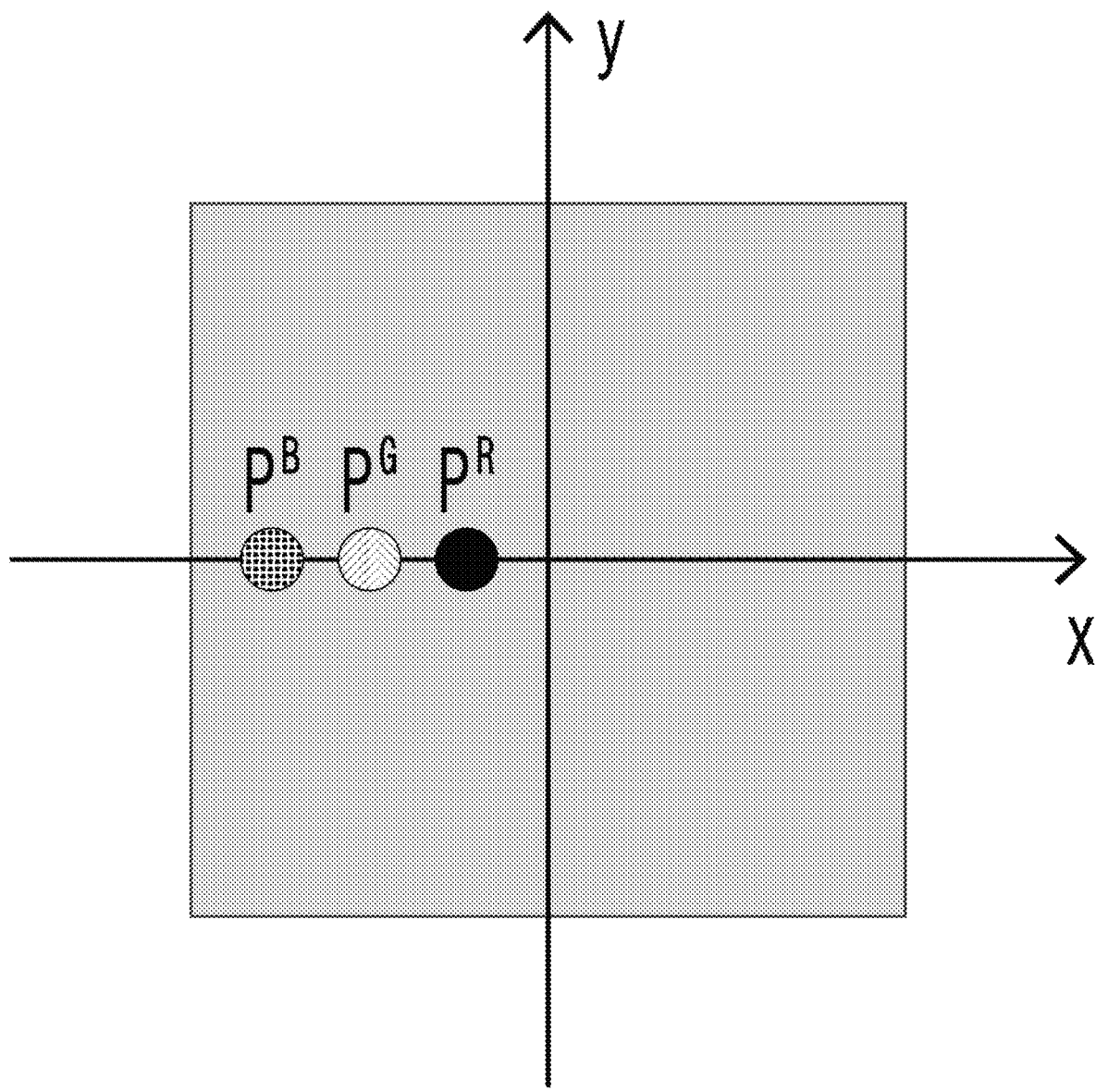

FIGS. 22A and 22B are enlarged views of a diffraction element and a light receiver according to an embodiment of the present disclosure.

As in the above formula, the diffraction angle is also proportional to the wavelength of the light used, so as shown in FIG. 4, each wavelength band has a different diffraction angle and proceeds. The light entering the diffraction element 2020 is diffracted again by the angle α at the diffraction element 2020 and enters the light receiver 2030.

In this case, assuming that light has a width or area of A and proceeds like a solid line without any abnormality, it is diffracted through the diffraction element 2020 and increases to the width or area of A/cos α in the light receiver 2030. Depending on the angle diffracted by the diffraction element 2020, the diffracted light (which is re-diffracted by the diffraction element) incident to the light receiver 2030 may be expanded by a considerable ratio. Accordingly, the controller may more easily sense the diffraction angle by checking the maximum point of the sensed value.

Further, the diffraction element 2020 is disposed at the above-described position so that the controller may check whether an abnormality has occurred in the light source 2050 as described above with reference to FIG. 5.

Referring back to FIGS. 20 and 21, the controller measures whether an abnormality has occurred in the light source 2050 as described above with reference to FIG. 6.

The controller controls the rotation element 2040 to measure the color implementation property of the holographic image output from the holographic display device. The process of measuring by the controller is shown in FIGS. 23 and 24.

Figure 23:
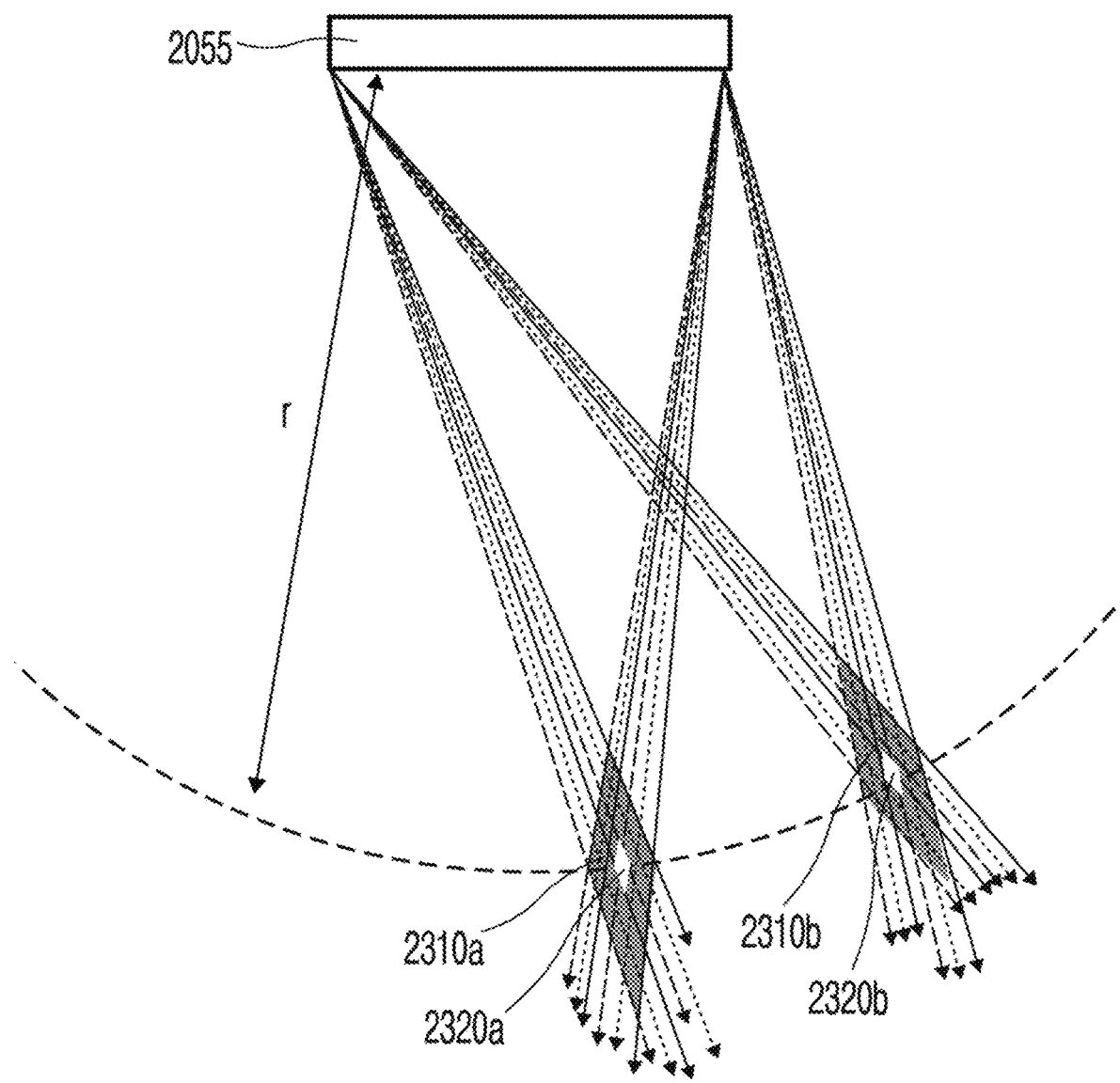
FIG. 23 is a view illustrating the size and shape of voxels for each wavelength formed by light diffracted from a spatial light modulator over a certain distance.

FIG. 23 is a view illustrating the size and shape of voxels for each wavelength formed by light diffracted from a spatial light modulator over a certain distance.

As described above with reference to FIG. 8, the controller may determine the size (area) of a voxel based on a sensing value of the light receiver 2030. Furthermore, while changing the distance from the spatial light modulator 2055, the light receiver 2030 may obtain sensing values for each angle.

Meanwhile, as shown in FIG. 23, when red, green, and blue lights are respectively irradiated, voxels are formed by the light of each color (wavelength). As described above, since the diffraction angle varies depending on the wavelength, the entire size of the voxel 2310 becomes larger than when the light of a single wavelength is irradiated. However, since lights of different colors are irradiated, a region of voxels 2320 capable of rendering white is formed by mixing lights of a plurality of colors. The corresponding area becomes relatively narrow. The controller calculates the entire area of the voxel 2310 and the white voxel 2320 from the sensing values of the diffracted light incident to the light receiver 2030 by the light irradiated from the respective light sources 2050r, 2050g, and 2050b or simultaneously irradiated. As will be described later with reference to FIG. 24, the controller determines whether or not the white voxel 2320 area is formed and (if formed) the color rendition and resolution of the holographic display device according to the area of the formed white voxel. The white voxel area is formed, thereby rendering relatively more colors and improving color rendition, and resolution at a corresponding position may be determined according to the size of the white voxel area.

Meanwhile, the controller determines the color crosstalk of the holographic display device based on the size of the entire area of voxels 2310. As the size of the entire area of voxels 2310 increases, the degree of crosstalk between adjacent voxels increases. For example, when white voxels 2320 are disposed adjacent to each other at a corresponding distance to form a pixel, the area of entire voxels 2310 is formed around the white voxel 2320 by the light of each wavelength band. As the entire area of voxel 2310 increases, the overlapping area with the entire area of adjacent voxels increases, resulting in crosstalk. The occurrence of color crosstalk makes it difficult for users to render accurate colors. The controller calculates the size of the area of the entire voxels 2310 and calculates the degree of color crosstalk at a corresponding distance based on how much the area overlaps between adjacent voxels.

Figure 24A:
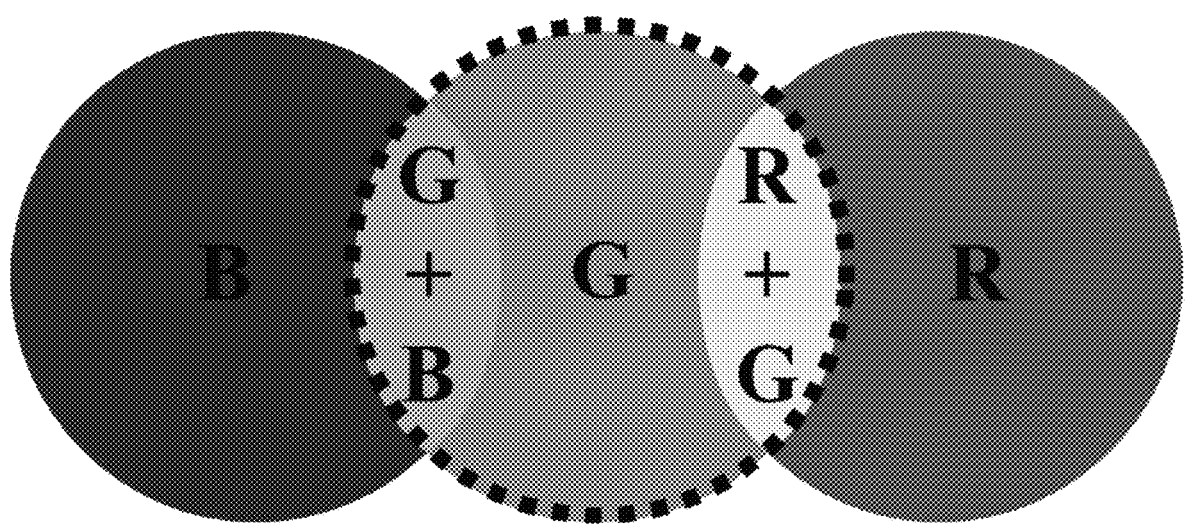
FIGS. 24A and 24B is a view illustrating light of each wavelength band diffracted from a spatial light modulator and incident to a light receiver.
Figure 24B:
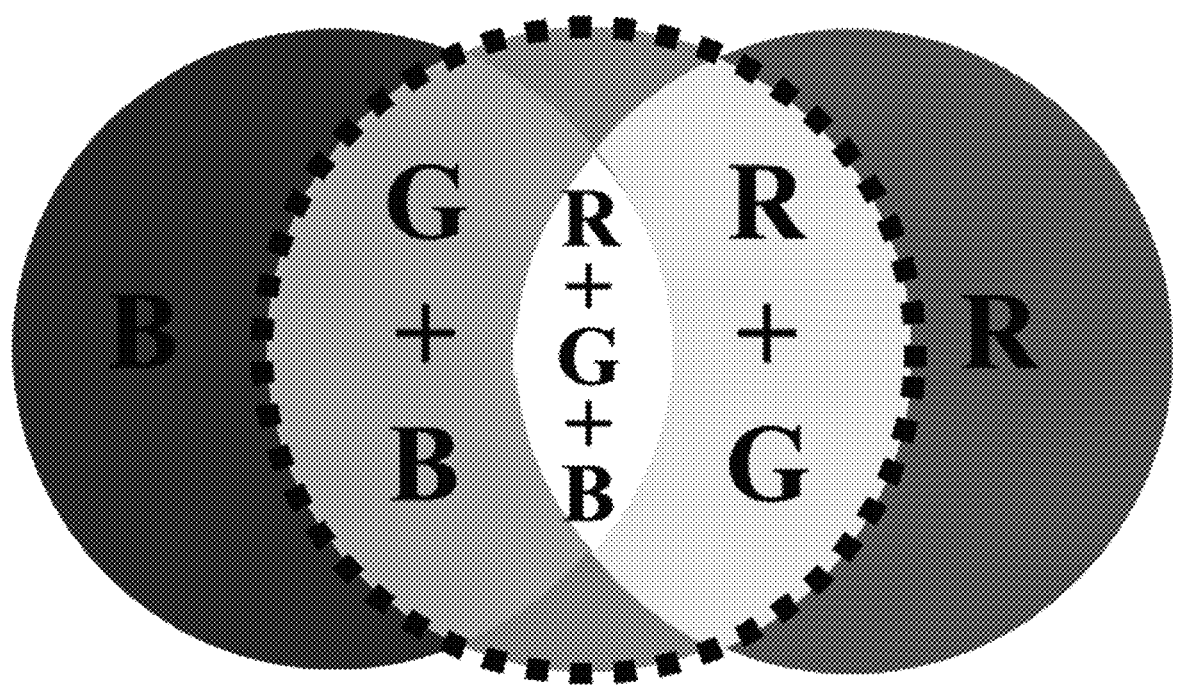
Figure 25:
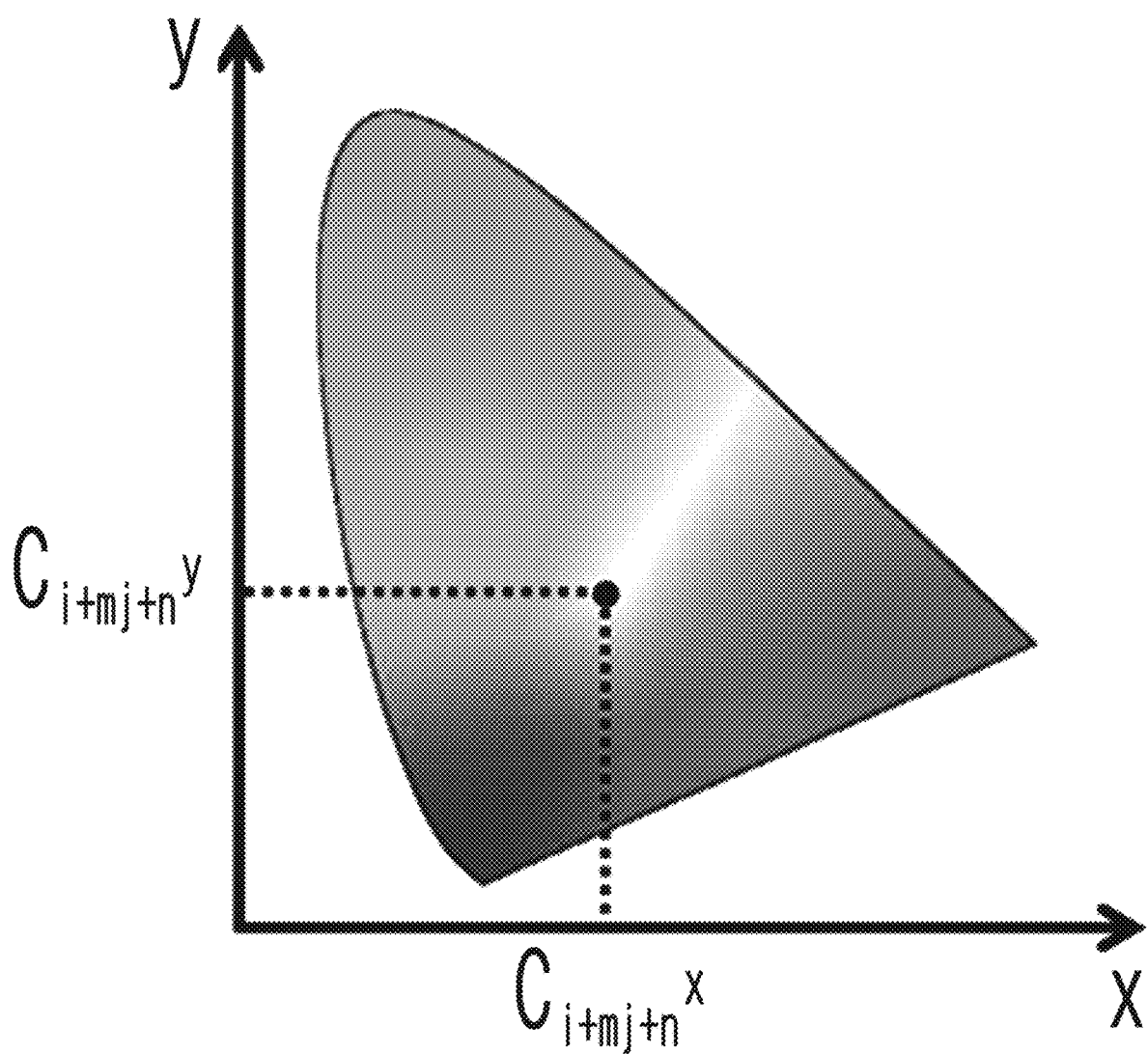
FIG. 25 is a view illustrating a CIE coordinate system.

FIGS. 24A and 24B are views illustrating light of each wavelength band diffracted from a spatial light modulator and incident to a light receiver.

Referring to FIG. 24A, when lights of different wavelength bands are incident to a specific voxel, the lights may be incident so that the lights of different wavelength bands are excessively diffracted, and a white voxel 2320 is not formed. The white voxel 2320 is not formed, resulting in insufficient color rendition. Since the area of the entire voxels 2310 is excessively large, significant crosstalk may occur between adjacent voxels. Further, since the area of the entire voxels 2310 increases, resolution at a specific distance is degraded.

Referring to FIG. 24B, when lights of different wavelength bands are incident to a specific voxel, the lights may be incident so that the lights of different wavelength bands are relatively less diffracted and may be incident to form a white voxel 2320. In this case, a white voxel 2320 is formed, and color rendition may be relatively excellent. This is because all colors can be rendered at least in the area of the white voxel 2320. Since the area of the entire voxels 2310 may be relatively small, the amount of crosstalk between adjacent voxels may be reduced. Further, since the area of the entire voxels 2310 is relatively small, resolution at a specific distance may increase.

As such, the controller determines whether the white voxel 2320 is formed from the sensed value by the light receiver 2030 that rotates by the rotation element 2040 at a specific distance and senses the diffracted light, and the degree of color rendition, degree of color crosstalk, and resolution based on the size (area) of the white voxel and entire voxels. The controller adjusts the distance (between the spatial light modulator and the light receiver) of the rotation element 2040 to determine the above-described color implementation property at each distance, thereby measuring the color implementation property of the entire output holographic image.

The above description is only an example of the technical idea of the present embodiment, and various modifications and variations can be made by those skilled in the art without departing from the essential property of the present embodiment. Therefore, the present embodiments are not intended to limit the technical idea of the present embodiment but to explain the present disclosure, and these embodiments do not limit the scope of the technical idea of the present disclosure. The protection scope of this embodiment should be interpreted by the claims below, and all technical ideas within the equivalent range should be construed as being included in the scope of the present disclosure.

What is claimed is:

1. A spatial property measurement device of a holographic image output from a holographic display device, the spatial property measurement device comprising:
   a light receiver receiving and sensing light output from a light source within the holographic display device and diffracted from a spatial light modulator within the holographic display device;
   a diffraction element disposed in front of the light receiver in a direction in which the light diffracted from the spatial light modulator is incident and re-diffracting the light diffracted from the spatial light modulator;
   a rotation element fixed within a predetermined range from the spatial light modulator at one end and fixed to the light receiver at the other end to rotate the light receiver and adjusting a distance between the light receiver and the spatial light modulator; and
   a controller adjusting the rotation angle of the rotation element and the distance between the light receiver and the spatial light modulator and analyzing the sensed value by the light receiver, thereby determining whether there is an abnormality in the arrangement of the spatial light modulator or the diffraction property of the spatial light modulator in the holographic display device,
   wherein the controller determines whether there is an abnormality in the arrangement of the spatial light modulator in the holographic display device based on whether the angle of the point having the strongest light amount among the values sensed by the light receiver changes for each distance while changing the distance between the light receiver and the spatial light modulator.

2. The spatial property measurement device of claim 1, wherein the diffraction element is an analog diffraction grating.

3. A spatial property measurement device of a holographic image output from a holographic display device, the spatial property measurement device comprising:
   a light receiver receiving and sensing light output from a light source within the holographic display device and diffracted from a spatial light modulator within the holographic display device;
   a diffraction element disposed in front of the light receiver in a direction in which the light diffracted from the spatial light modulator is incident and re-diffracting the light diffracted from the spatial light modulator;
   a rotation element fixed within a predetermined range from the spatial light modulator at one end and fixed to the light receiver at the other end to rotate the light receiver and adjusting a distance between the light receiver and the spatial light modulator; and
   a controller adjusting the rotation angle of the rotation element and the distance between the light receiver and the spatial light modulator and analyzing the sensed value by the light receiver, thereby determining whether there is an abnormality in the arrangement of the spatial light modulator or the diffraction property of the spatial light modulator in the holographic display device, wherein the controller determines whether there is an abnormality in the diffraction property of the spatial light modulator in the holographic display device based on whether the angle of the point having the strongest light amount among the values sensed by the light receiver changes for each distance, wherein the controller determines whether the angle changes nonlinearly while changing the distance between the light receiver and the spatial light modulator.

4. The spatial property measurement device of claim 3, wherein the controller determines that the angle of the point having the strongest light amount among the values sensed by the light receiver changes for each distance while changing the distance between the light receiver and the spatial light modulator, wherein the controller determines that an abnormality has occurred in a diffraction property of a spatial light modulator in the holographic display device when the angle changes nonlinearly.

\* \* \* \* \*